United States Patent
Zhou et al.

(10) Patent No.: US 12,410,280 B2
(45) Date of Patent: Sep. 9, 2025

(54) SYNTHESIS, PURIFICATION, AND PROPERTIES OF RING-OPENED BENZOXAZINE THERMOPLASTIC

(71) Applicant: KANEKA CORPORATION, Osaka (JP)

(72) Inventors: Tianlei Zhou, Pasadena, TX (US); Haiqing Yao, Pasadena, TX (US); Masahiko Miyauchi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 450 days.

(21) Appl. No.: 17/919,185

(22) PCT Filed: Apr. 15, 2021

(86) PCT No.: PCT/IB2021/020018
§ 371 (c)(1),
(2) Date: Oct. 14, 2022

(87) PCT Pub. No.: WO2021/209825
PCT Pub. Date: Oct. 21, 2021

(65) Prior Publication Data
US 2023/0159705 A1    May 25, 2023

Related U.S. Application Data

(60) Provisional application No. 63/127,653, filed on Dec. 18, 2020, provisional application No. 63/022,696, filed on May 11, 2020, provisional application No. 63/010,308, filed on Apr. 15, 2020.

(51) Int. Cl.
*C08G 73/02* (2006.01)
*C08J 3/24* (2006.01)
*C09J 179/04* (2006.01)

(52) U.S. Cl.
CPC ....... *C08G 73/0233* (2013.01); *C08G 73/024* (2013.01); *C08J 3/247* (2013.01); *C09J 179/04* (2013.01); *C08J 2379/02* (2013.01)

(58) Field of Classification Search
CPC .......... C08L 61/34; C08L 79/02; C08L 79/04; C08L 63/00; C08G 73/06; C08G 73/0233; C08G 73/024; C09D 179/00; C09D 179/02; C09D 179/04; C09D 181/00; C09D 181/02; C09J 179/00; C09J 179/02; C09J 179/04
See application file for complete search history.

(56) References Cited

U.S. PATENT DOCUMENTS

| | | | |
|---|---|---|---|
| 8,349,992 B2* | 1/2013 | Eguchi | C08L 79/04 528/289 |
| 8,852,382 B2 | 10/2014 | Setiabudi | |
| 9,695,273 B2 | 7/2017 | Gorodisher et al. | |
| 10,023,698 B2 | 7/2018 | Gorodisher et al. | |
| 2010/0015343 A1 | 1/2010 | Setiabudi | |
| 2010/0307680 A1 | 12/2010 | Gorodisher et al. | |
| 2010/0312004 A1* | 12/2010 | Gorodisher | C07C 323/52 564/341 |
| 2013/0140738 A1* | 6/2013 | Gorodisher | C08G 73/06 264/280 |
| 2015/0045528 A1 | 2/2015 | Gorodisher et al. | |
| 2017/0283558 A1 | 10/2017 | Gorodisher et al. | |
| 2017/0327476 A1* | 11/2017 | Cho | C08G 14/14 |

FOREIGN PATENT DOCUMENTS

| | | |
|---|---|---|
| CN | 110655650 A | 1/2020 |
| JP | 2010-518207 A | 5/2010 |
| JP | 2010-532392 A | 10/2010 |
| JP | 2015-502416 A | 1/2015 |
| JP | 2017-538836 A | 12/2017 |
| JP | 2018-200470 A | 12/2018 |
| WO | 2018003725 A1 | 1/2018 |

OTHER PUBLICATIONS

International Search Report issued in corresponding International Application No. PCT/IB2021/020016; mailed Jun. 22, 2021 (3 pages).
Written Opinion of the International Searching Authority issued in corresponding International Application No. PCT/IB2021/020016; dated Jun. 22, 2021 (4 pages).
Office Action issued in corresponding Japanese Patent Application No. 2022-562999, dated Jan. 9, 2024, with translation (6 pages).
Jungman, Matthew J., et al., "Post-modification of Alkyne-functionalized Thiol-Benzoxazine Copolymers", American Chemical Society, PMSE Preprints, 2012, http://pubs.acs.org/cgi-bin/preprints/display?div=pmse&meet=243&page=119865_16485.pdf (3 pages).
Office Action issued in corresponding Japanese Patent Application No. 2022-562999, dated Aug. 29, 2023, with translation (10 pages).
J. Wang et al, "Latent curing systems stabilized by reaction equilibrium in homogeneous mixtures of benzoxazine and amine," Scientific Reports, No. 6.38584, Dec. 5, 2016 (7 pages).

(Continued)

*Primary Examiner* — Christopher M Rodd
(74) *Attorney, Agent, or Firm* — Osha Bergman Watanabe & Burton LLP

(57) ABSTRACT

A crosslinkable thermoplastic resin composition may include a polymer formed from the reaction between a bis-benzoxazine monomer and a bifunctional comonomer having phenol, amine, and/or thiol functional groups, wherein the polymer contains at least one crosslinkable group. A method of forming a crosslinkable thermoplastic resin composition may include reacting a bis-benzoxazine monomer and a bifunctional comonomer to form a polymer containing at least one crosslinkable group. A method of forming a cured thermoplastic resin may include curing the crosslinkable thermoplastic resin composition by applying an external stimulus.

20 Claims, 13 Drawing Sheets

(56) References Cited

OTHER PUBLICATIONS

H. Oie et al., "Polyaddition of bifunctional 1,3-benzoxazine and 2-methylresorcinol," Journal of Polymer Science, Part A: Polymer Chemistry, 2013 (6 pages).
A.W. Kawaguchi, "Polymerization-Depolymerization System Based on Reversible Addition-Dissociation Reaction of 1,3-Benzoxazine with Thiol," ACS Macro Lett., No. 2, pp. 1-4, 2013 (4 pages).
International Search Report issued in corresponding International Application No. PCT/IB2021/020018 mailed Jun. 29, 2021 (4 pages).
Written Opinion issued in corresponding International Application No. PCT/IB2021/020018 mailed Jun. 29, 2021 (4 pages).

\* cited by examiner

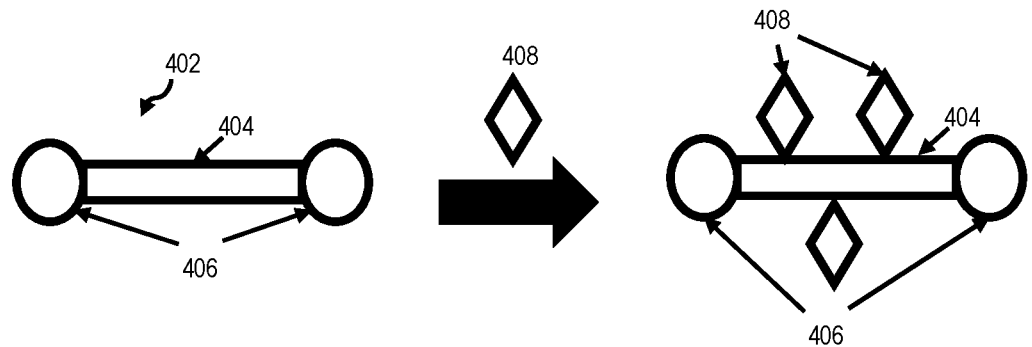
FIG. 4
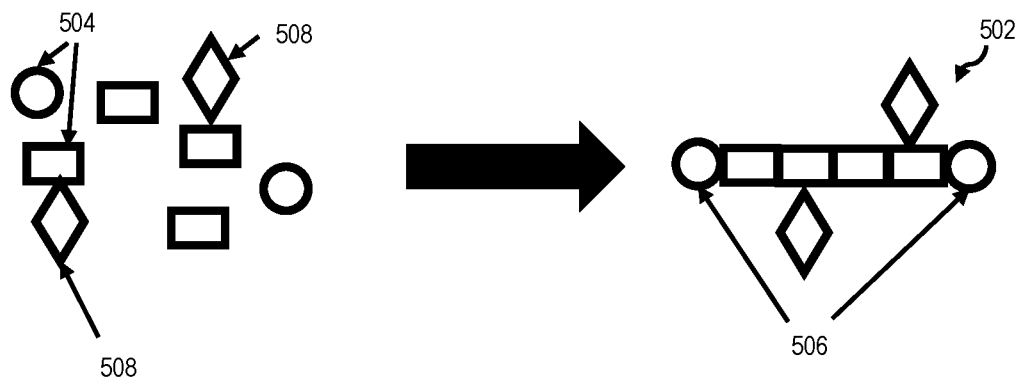
FIG. 5
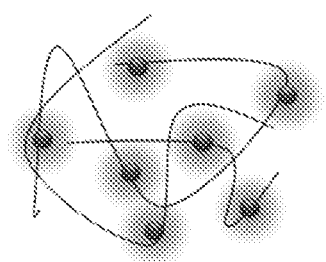
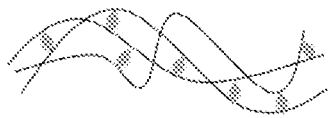
FIG. 6A          FIG. 6B

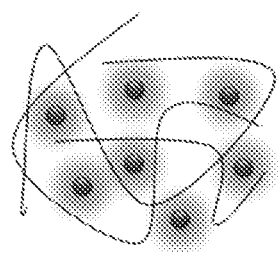 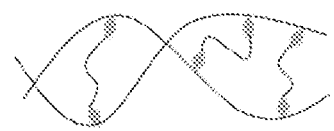
FIG. 7A
FIG. 7B
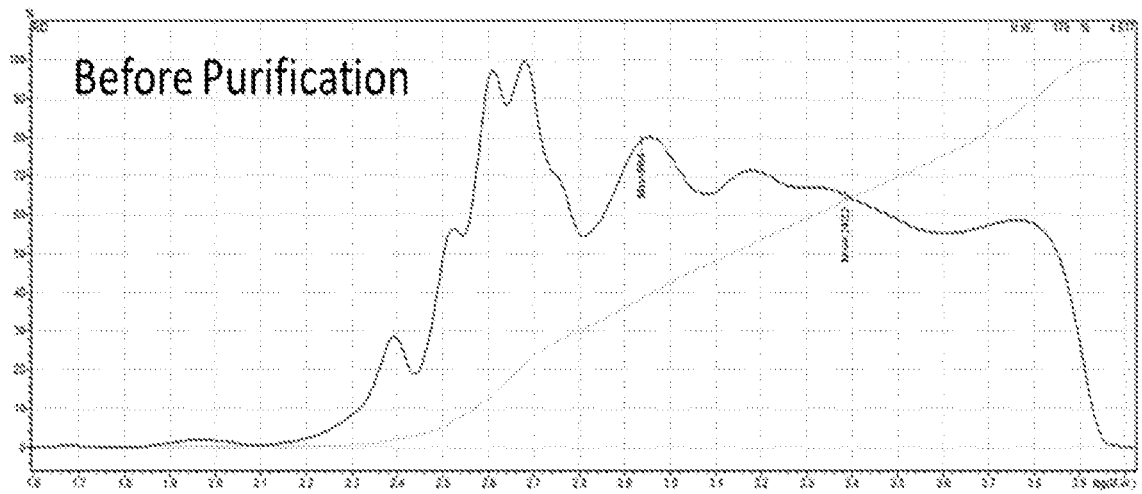
FIG. 8
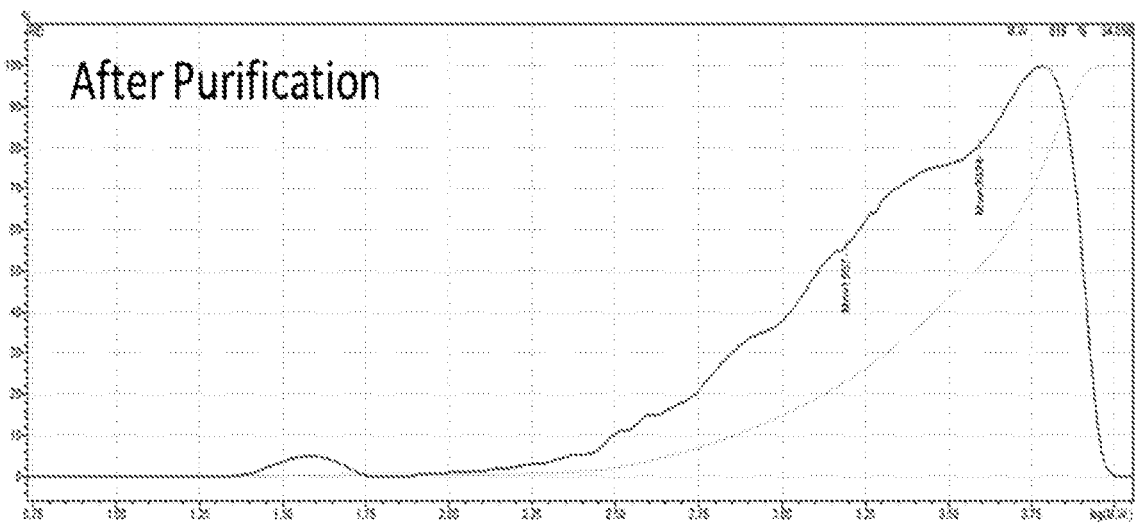
FIG. 9

SYNTHESIS, PURIFICATION, AND PROPERTIES OF RING-OPENED BENZOXAZINE THERMOPLASTIC

BACKGROUND

Thermoset resins ("thermosets") and thermoplastic resins ("thermoplastics") are distinct classes of polymers, distinguished from each other based on their behavior in the presence of heat. Specifically, thermoplastics such as polyethylene (PE), polycarbonate (PC), and polyetheretherketone (PEEK) become pliable or moldable upon application of heat (solidifying upon cooling), whereas thermosets such as epoxy, benzoxazine, and bismaleimide are irreversibly hardened upon curing, and cannot be melted or reshaped on heating. Thus, thermoplastic materials have melt temperatures (a melting point) where they start to flow, while thermoset products that have been cured can withstand higher temperatures without loss of their structural integrity.

Both thermosets and thermoplastics have been used in advanced composites as components for applications such as aerospace structures and interior components. Thermosets generally have high modulus and superior creep resistance in comparison to thermoplastics due to their three-dimensional network of bonds achieved upon crosslinking (curing). This results in their elongation-at-break values being lower than thermoplastics, and also generally requiring long periods of cure time at temperatures ranging up to 250° C. However, many uncured thermosets have limited shelf lives and there is risk of spoilage (fewer than six months in refrigerated storage for typical thermoset prepregs). Also, in order to achieve the desired state of cure, the cure cycle must be carefully controlled.

On the other hand, thermoplastic resins have the benefit of not requiring crosslinking (curing). Other benefits of thermoplastics include an indefinite shelf life at room temperature (in the absence of UV irradiation), short molding time, improved fire/smoke/toxicity (FST) performance, remoldability, enhanced vibration damping and acoustic attenuation, superior impact damage tolerance (impact toughness), an ability to tailor material forms (design flexibility), superior shear and fracture strength, and recyclability. Thermoplastics also offer the option to fuse or weld molded subcomponents, which can reduce assembly weight and stress concentrations by eliminating fasteners and adhesives. However, in general, thermoplastic resins have raw material costs that are significantly higher than competing thermosets. The molding of thermoplastic resins is also challenging. Most thermoplastic prepregs use PEEK, polyphenylene sulphide (PPS), polyimide (PI), polyetherimide (PEI), and so on, which are kept as preconsolidated dry sheets or boards that must be preheated to more than 350° C. to become pliable. Often, complex temperature-controlled tooling is required for obtaining the optimal laminate properties of thermoplastic resins.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a crosslinkable thermoplastic resin composition that includes a polymer formed from the reaction between a bis-benzoxazine monomer and a bifunctional comonomer having phenol, amine, and/or thiol functional groups, wherein the polymer contains at least one crosslinkable group.

In another aspect, embodiments disclosed herein relate to a method of forming a crosslinkable thermoplastic resin composition that includes reacting a bis-benzoxazine monomer and a bifunctional comonomer to form a polymer containing at least one crosslinkable group.

In another aspect, embodiments disclosed herein relate to a method of forming a cured thermoplastic resin composition, comprising providing crosslinkable thermoplastic resin composition and curing the crosslinkable thermoplastic resin composition by applying an external stimulus to form the cured thermoplastic resin.

Other aspects and advantages of the claimed subject matter will be apparent from the following description and the appended claims.

BRIEF DESCRIPTION OF DRAWINGS

FIG. 4 is a schematic depiction of a polymer modification strategy in accordance with one or more embodiments of the present disclosure.

FIG. 5 is a schematic depiction of a polymer synthesis strategy in accordance with one or more embodiments of the present disclosure.

FIG. 6A is a schematic depiction of a polymer including a curable functional group in accordance with one or more embodiments of the present disclosure.

FIG. 6B is a schematic depiction of a cured resin in accordance with one or more embodiments of the present disclosure.

FIG. 7A is a schematic depiction of a polymer composition including a curable component in accordance with one or more embodiments of the present disclosure.

FIG. 7B is a schematic depiction of a cured resin in accordance with one or more embodiments of the present disclosure.

FIGS. 8-9 depict gel permeation chromatography (GPC) data for exemplary thermoplastic resin compositions of one or more embodiments.

DETAILED DESCRIPTION

Figure 1:
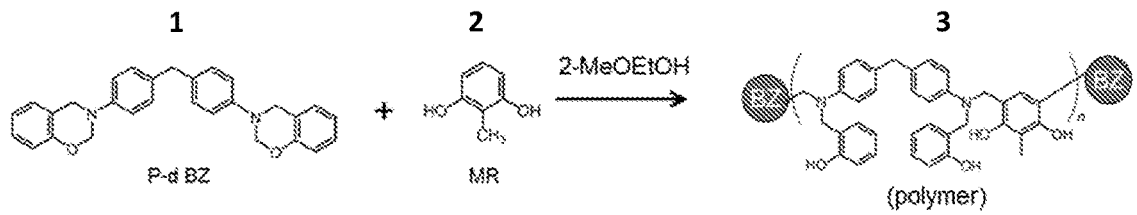
FIG. 1 is a schematic representation of the synthesis of a crosslinkable thermoplastic resin of one or more embodiments.

One or more embodiments of the present disclosure generally relate to crosslinkable thermoplastic resins that may provide a combination of properties not achievable with thermosets or thermoplastics alone. For example, the crosslinkable groups in the crosslinkable thermoplastic compositions may form a crosslinked structure by polymerization at elevated temperatures; however, below such temperatures, the properties of the crosslinkable thermoplastic resin may largely reflect the properties of a traditional thermoplastic (and can be melted/molded and remelted/remolded). After crosslinking, such compositions possess properties that reflect the properties of a traditional thermoset material (such as superior adhesion to fibers and a high temperature resistance).

Embodiments of the present disclosure also relate to the preparation of benzoxazine thermoplastic resins by methods that include, in one or more embodiments, solution polymerization and melt polymerization. In particular, one or more embodiments of the present disclosure relate to a one-pot solution polymerization using a solvent system in which the formed resin product has better solubility. Following polymerization, depending on the desired properties of the resin, the resin may be purified to remove unreacted monomers and oligomers in one or more embodiments, or the unreacted monomers and oligomers may be left in the resin to function as plasticizers in one or more other embodiments. Additionally, multi-functional groups can also be introduced through the multiple choices of available monomers, which can significantly broaden the application of the final polymer product.

Thus, one or more embodiments of the present disclosure also relate to benzoxazine thermoplastic resins having improved processability and/or thermostability. In one or more embodiments, such benzoxazine thermoplastic resins may contain unreacted monomers and oligomers functioning as plasticizers to impact the processability of the resin. Processability and thermostability may be improved by modifying the resin to react with at least some of the phenolic hydroxyl groups present in the resin.

Further, one or more embodiments of the present disclosure also relate to a benzoxazine thermoplastic resin that comprises a polymer that comprises benzoxazine ("BZ") containing monomer units and phenol, amine, and/or thiol containing monomer units. In some embodiments, the polymer may consist of the benzoxazine monomer units and the phenol, amine, and/or thiol containing monomer units. In some embodiments, the polymer may comprise ring-opened BZ-containing monomer units. The polymer may be capped with BZ terminal caps, which results in the benzoxazine thermoplastic resin being crosslinkable.

The BZ-containing monomer units may have a structure represented by formula (I):

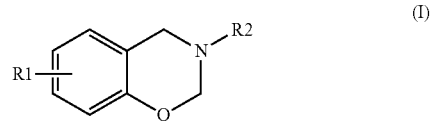

where R1 may represent one or more of a hydrogen atom, a hydrocarbon group, a substituted hydrocarbon group, and a functional group. The BZ-containing monomer units of one or more embodiments may include one or more substituents represented by R1. As used throughout this description, the term "hydrocarbon group" may refer to branched, straight chain, and/or ring-containing hydrocarbon groups, which may be saturated or unsaturated. The hydrocarbon groups may be primary, secondary, and/or tertiary hydrocarbons. As used throughout this description, the term "substituted hydrocarbon group" may refer to a hydrocarbon group (as defined above) where at least one hydrogen atom is replaced with a non-hydrogen group that results in a stable compound. Such substituents may be groups selected from, but are not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, vinyl, acetylene, acrylate, cyanate, epoxide, and heterocyclyl groups, and mixtures thereof. The functional groups may be groups selected from, but are not limited to, halo, hydroxyl, alkoxy, oxo, amino, amido, thiol, alkylthio, sulfonyl, alkylsulfonyl, sulfonamide, substituted sulfonamide, nitro, cyano, carboxy, carbamyl, alkoxycarbonyl vinyl, acetylene, acrylate, cyanate, epoxide groups, and mixtures thereof.

R2 is not particularly limited and may represent any of the groups mentioned with regard to R1. However, in particular embodiments, R2 may be a BZ-containing moiety. When R2 is a BZ-containing moiety, the BZ-containing monomer units may be bis-BZ monomer units. The bis-BZ monomer units may have a structure represented by formula (II):

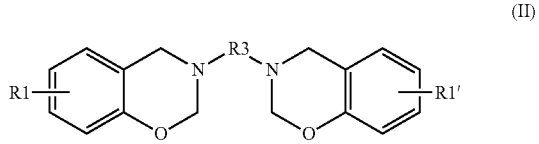

(II)

where R1 represents a group as discussed above with regard to formula (I). R1' may be a group that is the same as, or different from, R1. R3 may represent a hydrocarbon group or a substituted hydrocarbon group. In particular embodiments, R3 may represent an aromatic group selected from, but is not limited to, benzene, bibenzyl, diphenylmethane, naphthalene, anthracene, diphenyl ether, diphenyl sulfone ether, bis(phenoxy) benzene, stilbene, phenanthrene, fluorine, and substituted variants thereof. In one or more embodiments, R3 may represent a group having a molecular weight in a range of about 1 to 100,000 Da, or 1 to 10,000 Da, or 1 to 1,000 Da. In one or more embodiments, one or more ring-opened BZ-containing monomers can be used together with regard to formula (II).

In some embodiments, the polymer may comprise ring-opened BZ-containing monomer units. The BZ-containing monomer units may have a structure represented by formula (III):

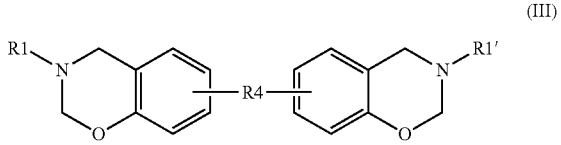

(III)

where R1 represents a group as discussed above with regard to formula (I). R1' may be a group that is the same as, or different from, R1. R4 may be selected from, but is not limited to, a hydrocarbon, ether, secondary-amino, amido, thioether, sulfonyl, sulfonamide, carbonyl, carbamyl, fluorenyl, alkoxycarbonyl, and mixtures thereof. In one or more embodiments, R4 may represent a group having a molecular weight of a range of about 1 to 100,000 Da, or 1 to 10,000 Da, or 1 to 1,000 Da. In one or more embodiments, one or more ring-opened BZ-containing monomers represented by formula (III) may be used in combination. In one or more embodiments, one or more ring-opened BZ-containing monomers represented by formula (II) and (III) may be used in combination.

In one or more embodiments, the benzoxazine thermoplastic polymer may contain either a single endcap or two endcaps that are crosslinkable groups. In some embodiments, these crosslinkable groups may be BZ moieties. In particular embodiments, the BZ moieties may be derived from the BZ-containing monomer unit, discussed above. Upon curing, these crosslinkable groups may crosslink multiple polymers, providing thermoset properties. In some embodiments, BZ moieties are used that thermally cure in a temperature range of 150 to 260° C., or at a temperature of 250° C. or less, or 225° C. or less, or 200° C. or less in more particular embodiments. A low curing temperature may enable the crosslinkable thermoplastic resin of one or more embodiments to be converted to the cured structure easily by thermal molding using a hot press, oven, autoclave, etc. The curing temperature and other properties of a crosslinkable thermoplastic resin are heavily affected by the selection of the monomers and the structure of the resin formed. Therefore, the suitability of a given monomer is dependent upon the desired resin's rheological behavior, extent of crosslinking upon curing, and resulting tensile, mechanical, and thermal properties. As explained in greater detail below, the benzoxazine thermoplastic polymer may be cured via an external stimulus, such as by UV and/or microwave curing. In some embodiments, curable groups, such as those that are UV- and/or microwave-curable, may be introduced into the resin to facilitate UV and/or microwave curing.

In one or more embodiments, the benzoxazine thermoplastic resins of the present disclosure may generally include a polymer that comprises a bifunctional monomer, such monomers having functional groups selected from phenols, amine, and thiol functional groups.

In one or more particular embodiments, the polymer may include phenol-containing monomer units. The phenol-containing monomer units of one or more embodiments may have a structure as represented by formula (IV):

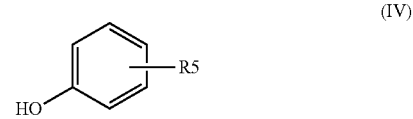

(IV)

R5 is not particularly limited and can represent one or more of a hydrogen atom, a hydrocarbon group, a substituted hydrocarbon group, a hydroxyl group, and a functional group. The phenol containing monomer units of one or more embodiments may include one or more substituents represented by R5. For example, in particular embodiments, the phenol-containing monomer represented by formula (IV) may be a benzenediol (catechol, resorcinol, or hydroquinone), or substituted benezenediols (2-methylresorcinol, 2-ethylresorcinol, 4-methylcatechol, and so on, including alkoxylated derivatives thereof, in which the alkyl groups are placed by alkoxy groups).

In particular embodiments, R5 may be a phenol-containing moiety. In one or more embodiments, one or more phenol-containing monomers represented by formula (IV) may be used in combination. When R5 is a phenol-containing moiety, the phenol-containing monomer units may be bisphenol monomer units. The bisphenol monomer units may have a structure represented by formula (V):

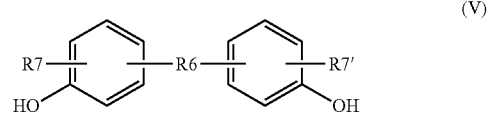

(V)

where R7 represents a group as discussed above with regard to R5. R7' may be a group that is the same as, or different from, R7. R6 may represent a hydrocarbon group or a substituted hydrocarbon group. The bisphenol monomer of one or more embodiments may be one or more of the group consisting of 2,2'-bis(4-hydroxyphenyl)propane (bisphenol A), 2,2'-bis(4-hydroxyphenyl)butane (bisphenol B), 1,1'-bis(4-hydroxyphenyl)ethane (bisphenol E), 2,2'-bis(4-hydroxy-3-isopropylphenyl)propane (bisphenol G), bis(4-hydroxyphenyl)methane (bisphenol F), 2,2'-bis(4-hydroxyphenyl) hexafluoropropane (bisphenol AF), 4,4'-(1-phenylethylidene)bisphenol (bisphenol AP), 4,4'-cyclohexylidenebisphenol (bisphenol Z), bis(4-hydroxyphenyl) sulfone (bisphenol S), 4,4'-(9-fluorenylidene) diphenol (bisphenol FL), 4,4'-(1,3-phenylenediisopropylidene) bisphenol (bisphenol M), 4,4'-(1,4-phenylenediisopropylidene) bisphenol (bisphenol P), and substituted derivatives thereof. In particular embodiments, the bisphenol monomer may be one or more of 3,3'-dimethylbisphenol A (bisphenol C), 3,3'-diallylbisphenol A, and 2,2'-bis(2-hydroxy-5-biphenylyl)propane (bisphenol PH). In one or more embodiments, one or more bisphenol-containing monomers represented by formula (V) may be used in combination. In one or more embodiments, one or more phenol- or bisphenol-containing monomers represented by formula (IV) and (V) may be used in combination.

As mentioned above, in one or more embodiments, the polymer of the present disclosure may include a bifunctional monomer containing amine groups, or diamines such as aromatic diamines, silicone-based diamines, alkyl diamines, and polyetheramines. Diamines in accordance with the present disclosure may include aromatic diamine compounds having a carbon number of 6 to 27, such as bis[4-(3-aminophenoxy)phenyl]sulfone (BAPS-m), bis[4-(4-aminophenoxy)phenyl]sulfone (BAPS-p), 1,4-diaminobenzene (PPD), 1,3-diaminobenzene (MPD), 2,4-diaminotoluene (2,4-TDA), 4,4'-diaminodiphenylmethane (MDA), 4,4'-diaminodiphenylether (ODA), 3,4'-diaminodiphenylether (DPE), 3,3'-dimethyl-4,4'-diaminobiphenyl (TB), 2,2'-dimethyl-4,4'-diaminobiphenyl (m-TB), 2,2'-bis(trifluoromethyl)-4,4'-diaminobiphenyl (TFMB), 3,7-diamino-dimethyldibenzothiophen-5,5-dioxide (TSN), 4,4'-diaminobenzophenone, 3,3'-diaminobenzophenone, 4,4'-bis(4-aminophenyl) sulfide (ASD), 4,4'-diaminodiphenyl sulfone (ASN), 4,4'-diaminobenzanilide (DABA), 1,n-bis(4-aminophenoxy)alkane (n=3,4 or 5, DAnMG), 1,3-bis(4-aminophenoxy)-2,2-dimethylpropane (DANPG), 1,2-bis[2-(4-aminophenoxy)ethoxy]ethane (DA3EG), 1,5-bis(4-aminophenoxy) pentane (DA5MG), 1,3-bis(4-aminophenoxy) propane (DA3MG), 9,9-bis(4-aminophenyl)fluorene (FDA), 5(6)-amino-1-(4-aminomethyl)-1,3,3-trimethylindan, 1,4-bis(4-aminophenoxy)benzene (TPE-Q or APB-144), 1,3-bis(4-aminophenoxy)benzene (TPE-R or APB-134 or RODA), 1,3-bis(3-aminophenoxy)benzene (APB or APB-133)), 4,4'-bis(4-aminophenoxy) biphenyl (BAPB), 4,4'-bis(3-aminophenoxy)biphenyl, 2,2-bis(4-aminophenoxyphenyl)propane (BAPP), 2,2-bis[4-(4-aminophenoxy)phenyl]hexafluoropropane (HFBAPP), 3,3'-dicarboxy-4,4'-diaminodiphenylmethane (MBAA), 4,6-dihydroxy-1,3-phenylenediamine (known as 4,6-diaminoresorcin), 3,3'-dihydroxy-4,4'-diaminobiphenyl (HAB) and 3,3',4,4'-tetraminobiphenyl (TAB); aliphatic or alicyclic diamine compounds having a carbon number of 6 to 24 such as 1,6-hexamethylenediamine (HMD), 1,8-octamethylenediamine (OMDA), 1,9-nonamethylene diamine, 1,12-dodecamethylene diamine (DMDA), 1-amino-3-aminomethyl-3,5,5-trimethylcyclohexane, 4,4'-dicyclohexylmethanediamine and cyclohexanediamine; and silicone based diamine compounds such as 1,3-bis(3-aminopropyl)-1,1,3,3-tetramethyldisiloxane and polydimethyl siloxane (PDMS). Other embodiments may use one or more flexible comonomers that include aromatic diamines (VI) or (VII), wherein each $R^3$ is independently selected from H, $CH_3$, or halogen, and n is an integer in the range of 1 to 7, and alkyl diamines such as hexamethylene diamine (VII):

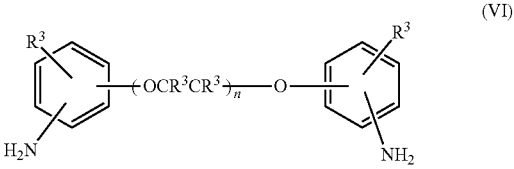

(VI)

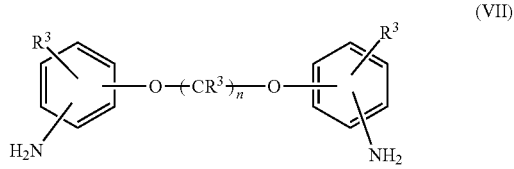

(VII)

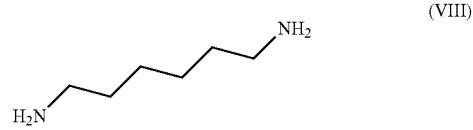

(VIII)

In one or more embodiments, the polymer of the present disclosure may include a bifunctional monomer containing thiol groups. Thiol-containing monomers may have the general formula $HS-R^8-SH$, where $R^8$ may represent a hydrocarbon group or a substituted hydrocarbon group, including an alkyl or aromatic backbone, which may be optionally substituted with alkyl and/or aromatic pendant groups.

Figure 2:
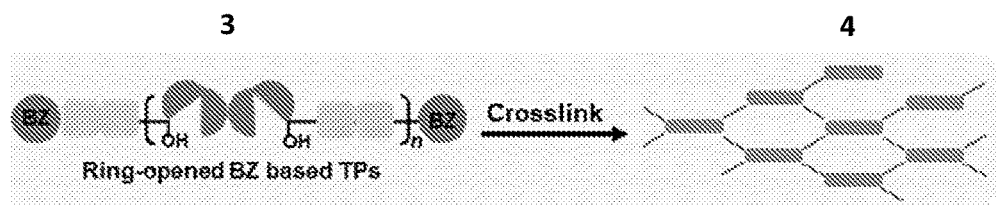
FIG. 2 is a schematic representation of the curing of a crosslinkable thermoplastic resin of one or more embodiments.

As depicted by the general reaction scheme of FIG. 1, the polymer represented by the benzoxazine thermoplastic resins of one or more embodiments may comprise a ring-opened benzoxazine structure 3, resulting from the reaction of a bis-BZ 1 and a benzenediol 2. The embodiment shown in FIG. 1 exemplifies a solution polymerization, however melt polymerization processes may also be used to form the ring-opened benzoxazine structure 3. As shown in FIG. 2, the benzoxazine thermoplastic resin 3 having terminal BZ groups may be cured to give a crosslinked structure 4. Specifically, by including the bifunctional benzoxazine monomer in a greater molar quantity, relative to the comonomer, a greater the number of terminal benzoxazine groups may result and allow for crosslinking to subsequently occur, as shown in FIG. 2. Thus, in one or more embodiments, in solution polymerization methods, the molar ratio between the bifunctional benzoxazine monomer and the bifunctional comonomer may range from greater than 1:1 to 2:1, such as having a lower limit of any of 1:1, 1.2:1, or 1.5:1, to an upper limit of any of 1.5:1, 1.75:1, or 2:1, where any lower limit can be used in combination with any upper limit.

Crosslinkable thermoplastic resins in accordance with one or more embodiments of the present disclosure may contain one or more polymers. In one or more embodiments, two or more crosslinkable thermoplastic resins may be blended by mixing in a melted state or in solution. In one or more embodiments, two or more monomers may be used together and copolymerized in a polymer.

Crosslinkable thermoplastic resins in accordance with one or more embodiments of the present disclosure may have a weight average molecular weight (Mw) of a range from about 1 to 1,000 kilodaltons (kDa). In some embodiments, the Mw of the crosslinkable thermoplastic resin may be of a range having a lower limit of one of 1, 5, 10, 20, 30, 50, 100, 150, 200, 250, and 300 kDa, and an upper limit of one of 20, 30, 50, 100, 150, 200, 250, 500, 750, and 1000 kDa, where any lower limit may be paired with any upper limit.

Crosslinkable thermoplastic resins in accordance with one or more embodiments of the present disclosure may have a number average molecular weight (Mn) of a range from about 1 to 100 kDa. In some embodiments, the Mn of the crosslinkable thermoplastic resin may be of a range having a lower limit of one of 1, 5, 10, 20, 30, 50, and 70 kDa, and an upper limit of one of 20, 30, 50, 70, and 100 kDa, where any lower limit may be paired with any upper limit.

Crosslinkable thermoplastic resins in accordance with one or more embodiments of the present disclosure may have a polydispersity index (Mw/Mn) of a range from about 1 to 5. In some embodiments, the polydispersity index of the crosslinkable thermoplastic resin may be of a range having a lower limit of one of 1, 2, 3, and 4, and an upper limit of one of 2, 3, 4, and 5, where any lower limit may be paired with any upper limit.

As mentioned above, the melt viscosity of the crosslinkable thermoplastic resins may be altered, for example, through the selection of the monomers, the polymerization conditions, and the structure of the resin formed. In one or more embodiments, at a temperature of 140° C., the melt viscosity of the crosslinkable thermoplastic resin may be 50000 Pa·s or less, 20000 Pa·s or less, 10000 Pa·s or less, 5000 Pa·s or less, 4000 Pa·s or less, 3000 Pa·s or less, 2000 Pa·s or less, or 1000 Pa·s or lower. In some embodiments, the melt viscosity of the crosslinkable thermoplastic resin may be of a range having a lower limit of one of 1, 50, 100, 250, 500, 750, 1000, 2000, 3000, 4000, 5000, and 6000 Pa·s, and an upper limit of one of 1000, 2000, 3000, 4000, 5000, 6000, 7000, 8000, 10000, 20000, 40000, or 50000 Pa·s, where any lower limit may be paired with any upper limit.

In one or more embodiments, the polymer may be obtained by solution polymerization using a solvent (or solvent mixture) having a boiling point greater than 75° C. under 1 atm. Such solvents and solvent mixtures include, but are not limited to, ethyl acetate, 2-methoxyethanol, dimethylformamide (DMF), N-methylpyrrolidone (NMP), butyl acetate, and a mixture of 2-methoxyethyanol/tetrahydrofuran (THF). In one or more embodiments, the solvent may be selected based on the solubility of the monomers (particularly the bifunctional benzoxazine) to achieve a solution having at least 20% solid content at room temperature. Advantageously, as found by the present inventors, while conventional benzoxazine polymerizations occur in solvents such as methanol to dissolve the monomers in the solvents, the use of the presently described solvents may provide for better solubility of the resulting polymer, allowing for a higher molecular weight resin to be synthesized. Further, it is also envisioned that the solvent may be a blend of solvents having a boiling point greater than 75° C. used in combination with a solvent a lower boiling point less than 75° C., where the solvent having a boiling point greater than 75° C. is used in an amount ranging from 50 to 100 vol % and the solvent having a boiling point less than 75° C. is used in an amount ranging from 0 to 50 vol %. Such solvents having a boiling point less than 75° C. may include, for example, methanol, ethanol, and so on.

Thus, in one or more embodiments, the synthesis may occur by adding a bifunctional benzoxazine monomer and a bifunctional comonomer in a solvent (or solvent blend) such as those described here, heating the mixture to a temperature ranging from 45° C. up to the boiling point of the solvent for a reaction time that may range from 1 hour to 120 hours, depending on the reaction temperature used.

Figure 3:
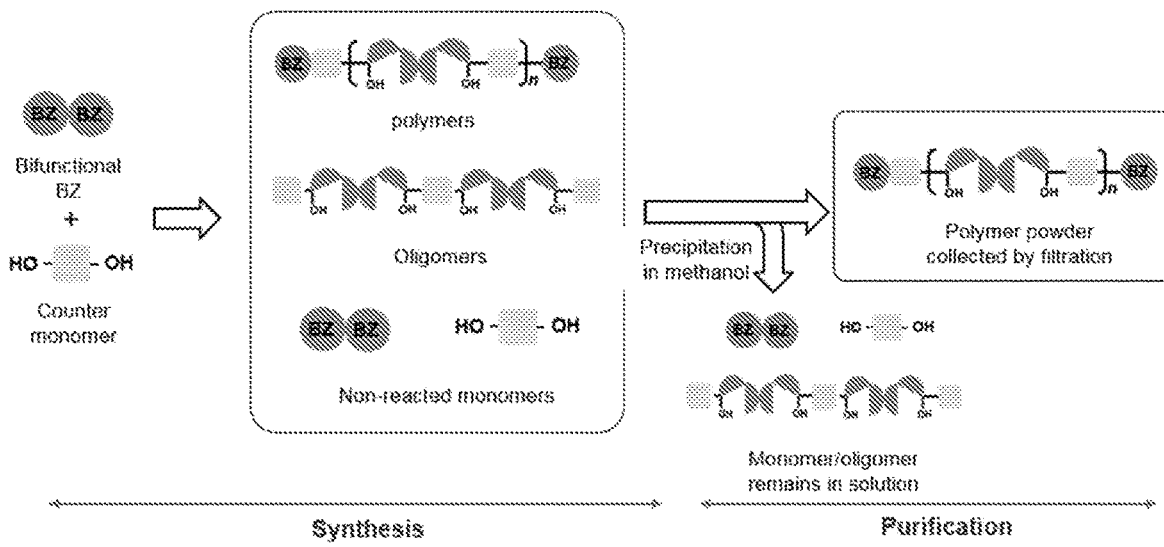
FIG. 3 is a schematic representation of the purification of a crosslinkable thermoplastic resin of one or more embodiments.

Further, as the resulting resin may remain soluble in the solvent, the one-pot synthesis may also allow for a simplified purification (in comparison to conventional multi-step purifications). Specifically, when purification is desired, following the conclusion of the reaction (and after the reaction is cooled to room temperature), the solution maybe directly combined with a purification solvent where the high molecular weight component (the polymer) precipitates out of solution, and the unreacted monomers and oligomers remain in solution, as shown in FIG. 3. Such purification solvent may be selected from, but is not limited to, methanol, ethanol, propanol, isopropanol, n-hexane, cyclohexane, and mixtures thereof. Following such precipitation, the solid resin may be collected by filtration and dried, such as in a vacuum oven. Thus, in one or more embodiments, the purified resin may have an unreacted monomer and oligomer content that is less than 5 wt. %, less than 2 wt. %, less than 1 wt. %, or less than 0.5 wt. %.

In one or more embodiments, this polymer may be obtained through a melt polymerization process. In some embodiments, melt polymerization may be used for synthesis of the polymer as there is no solvent required, the reaction time is greatly reduced as compared to solution-phase polymerization, it is suitable for a variety of monomer choices, and it can be applied in an in situ prepreg process.

In the melt polymerization of one or more embodiments, the ramp rate may range from about 0.5 to 5° C./min. In some embodiments, the ramp rate may be of a range having a lower limit of one of 0.5, 1.0, 1.5, 2.0, 2.5, 3.0° C./min and an upper limit of one of 2.0, 2.5, 3.0, 4.0, and 5.0° C./min, where any lower limit may be paired with any upper limit.

The melt polymerization of one or more embodiments may have a final temperature ranging from about 120 to 180° C. In some embodiments, the melt polymerization may have a final temperature of a range having a lower limit of one of 120, 125, 130, 135, 140, 145, 150, and 160° C. and an upper limit of one of 140, 145, 150, 155, 160, 165, 170, 175, and 180° C., where any lower limit may be paired with any upper limit.

The melt polymerization of one or more embodiments may have a final temperature hold time ranging from about 2 to 30 minutes. In some embodiments, the melt polymerization may have a final temperature hold time of a range having a lower limit of one of 2, 3, 4, 5, 6, 8, 10, and 12 minutes and an upper limit of one of 3, 5, 7, 9, 10, 12, and 15, 20, 30 minutes, where any lower limit may be paired with any upper limit.

The melt polymerization of one or more embodiments may be performed for a total time ranging from about 60 to 180 minutes. In some embodiments, the melt polymerization may be performed for a total time of a range having a lower limit of one of 60, 70, 80, 90, 100, 120, 140, and 160 minutes and an upper limit of one of 80, 100, 120, 140, 150, 160, 170, and 180 minutes, where any lower limit may be paired with any upper limit.

In one or more embodiments, the melt polymerization may include the benzoxazine monomers and the phenol-containing monomers in a molar ratio of 1:10 to 10:1 (benzoxazine monomers to phenol-containing monomers). In some embodiments, the molar ratio of the benzoxazine monomers to the phenol-containing monomers may be of a range having a lower limit of one of 1:10, 1:8, 1:5, 1:3 1:2, 1:1, and 2:1 and an upper limit of one of 1:2, 1:1, 2:1, 3:1, 5:1, 8:1, and 10:1, where any lower limit may be paired with any upper limit.

The melt polymerization of one or more embodiments may comprise mixing the monomers by solvent or melt mixing. In one or more embodiments, the melt polymerization involves an application of heat that may be performed using, but is not limited to, an oven, an extruder, a hot plate, a hot press machine, an autoclave, and so on. In one or more embodiments, the melt polymerization may be performed under, but not limited to, standard atmospheric pressure, vacuum, and an inert atmosphere, such as argon or nitrogen gas. In one or more embodiments, the melt polymerization by application of heat may be performed under a flow of, but is not limited to, air, and an inert gas, such as argon or nitrogen.

As previously described, a solution-based synthetic method may also provide the same chemical structure of ring-opened benzoxazine thermoplastics. The synthesis method may be selected based upon the reactivity and solubility of the monomers being used. For example, for some highly reactive bisphenol monomers, like cresol, a solution method may achieve similar results to a melt polymerization method, but for monomers such as 3,3'-dimethylbisphenol A and 3,3'-diallylbisphenol A, a solution method may not provide the same molecular weight and final mechanical and thermal properties. Thus, the selection of the synthesis route may also depend on the desired properties of the resin.

In embodiments in which resins are purified following solution polymerization, following purification, the purified and crosslinkable benzoxazine resin of the present disclosure may have a weight average molecular weight (Mw) of a range from about 1 to 1,000 kilodaltons (kDa) and a number average molecular weight (Mn) of a range from about 1 to 100 kDa. The Mw of the purified and crosslinkable benzoxazine resin may have a lower limit of one of 1, 5, 10, 20, 30, 50, 100, 150, 200, 250, and 300 kDa, and an upper limit of one of 20, 30, 50, 100, 150, 200, 250, 500, 750, and 1000 kDa, where any lower limit may be paired with any upper limit. The Mn of the purified and crosslinkable benzoxazine resin may have a lower limit of any of 1, 2, 5, 10, 20, 30, 50, or 70 kDa, and an upper limit of any of 20, 30, 50, 70, or 100 kDa, where any lower limit can be used in combination with any upper limit.

One or more embodiments, however, relate to a resin composition that may maintain the inclusion of at least a portion of the unreacted monomers and oligomers formed during synthesis, when it may be desired to have a resin composition having a lower melt viscosity than a purified resin product. In solution polymerization processes, a solution after synthesis may be treated by solvent evaporation to obtain the resin containing monomers and oligomers. In particular, the present inventors have found that the presence of the unreacted monomers and oligomers may function as a plasticizer, disrupting the hydrogen bonds that form between polymer chains, thereby improving the processability of the resin. Thus, in one or more embodiments of the present disclosure, a resin composition may include a benzoxazine polymer, oligomers, and unreacted monomers. For example, the resin composition may have a polymer content ranging from a lower limit of one of 30, 40, 50, or 75 wt. %, and an upper limit of one of 50, 60, 70, 80, or 90 wt. %, where any lower limit may be paired with any upper limit. Resin compositions in accordance with one or more embodiments of the present disclosure may have an unreacted monomer content of 25% by weight (wt. %) or less, of 15 wt. % or more, of 10 wt. % or more, or of 5 wt. % or more. Resin compositions in accordance with one or more embodiments of the present disclosure may have an oligomer content of 25% by weight (wt. %) or less, of 15 wt. % or more, of 10 wt. % or more, or of 5 wt. % or more.

Benzoxazine thermoplastic resins in accordance with one or more embodiments of the present disclosure may contain no unreacted monomer content. In one or more embodiments, any unreacted monomers may be removed from the polymer through a purification method. The purification method may involve dissolving the resin into THF, and then adding a solvent such as methanol to precipitate the polymer.

Benzoxazine thermoplastic resins in accordance with one or more embodiments of the present disclosure may contain units derived from the benzoxazine monomer in an amount ranging from 0 to 40 wt. %. In some embodiments, the benzoxazine thermoplastic resins may contain units derived from the benzoxazine monomer in an amount of a range having a lower limit of one of 0, 0.5, 1, 2, 5, 10, 20, and 30 wt. % and an upper limit of one of 1, 2, 5, 10, 20, 30, and 40 wt. %, where any lower limit may be paired with any upper limit.

Benzoxazine thermoplastic resins in accordance with one or more embodiments of the present disclosure may contain units derived from the bifunctional comonomer in an amount ranging from 0 to 40 wt. %. In some embodiments, the benzoxazine thermoplastic resins may contain units derived from the bifunctional comonomer in an amount of a range having a lower limit of one of 0, 0.5, 1, 2, 5, 10, 20, and 30 wt. % and an upper limit of one of 1, 2, 5, 10, 20, 30, and 40 wt. %, where any lower limit may be paired with any upper limit.

Such resin composition may have a minimum melt viscosity ranging from 1 to 5000 Pa·s. For example, the resin composition may have a minimum melt viscosity having a lower limit of any of 1, 5, 10, 50, 100, 500, or 1000 Pa·s, and an upper limit of any of 1000, 2000, 3000, 4000, or 5000 Pa·s, where any lower limit can be used in combination with any upper limit.

In one or more other embodiments, the processability and thermostability of the benzoxazine resins of the present disclosure may also be improved by modifying at least a portion of the phenolic hydroxyl groups present in the resin. Such modification may be by acetylation of at least a portion of the phenolic hydroxyl groups. For example, in one or more embodiments, the portion of phenolic hydroxyl groups that are modified may range from a lower limit of any of 10, 20, 30, 40, or 50 percent, and an upper limit ranging from 40, 50, 60, 70, 80, 90, or 100 percent, where any lower limit can be used in combination with any upper limit.

In one or more embodiments, a purified resin may be re-dissolved in a polar and aprotic solvent, including but not limited to THF, DMF or NMP and reacted with a modifying agent such as an acetylating agent. However, it is also envisioned that other modifications of phenol group(s) by other functional groups are within the scope of the present disclosure. Such modifications may be by nucleophilic substitution or condensation reactions to form an ether derivative, an acrylate/methacrylate derivative, an oxirane derivative, a carbamate derivative, a phosphorylated derivative, a glycolipid derivative, an ester derivative, a polyethoxylate derivative, or a benzoxazine ring structure. Examples of acetylating agents include, but are not limited to, acetic anhydride or acyl halides. Other modifying agents include those presented in Lochab et al., RSC Adv. 2014, 4, 21712 at 21730, which is herein incorporated by reference in its entirety. Further, in order to reduce premature ring-opening of terminal BZ groups during the acetylation, it is envisioned that a neutralizing agent such as sodium bicarbonate may be added so that any released acid may be neutralized.

In one or more embodiments, the modified benzoxazine resin, such as the acetylated benzoxazine resin, may have a minimum melt viscosity ranging from 1 to 5000 Pa·s. For example, the resin composition may have a minimum melt viscosity having a lower limit of any of 1, 5, 10, 50, 100, 500, or 1000 Pa·s, and an upper limit of any of 1000, 2000, 3000, 4000, or 5000 Pa·s, where any lower limit can be used in combination with any upper limit.

Following modification, the modified benzoxazine resin of the present disclosure may have a weight average molecular weight (Mw) of a range from about 1 to 1,000 kilodaltons (kDa) and a number average molecular weight (Mn) of a range from about 1 to 100 kDa. The Mw of the modified benzoxazine resin may have a lower limit of one of 1, 5, 10, 20, 30, 50, 100, 150, 200, 250, and 300 kDa, and an upper limit of one of 20, 30, 50, 100, 150, 200, 250, 500, 750, and 1000 kDa, where any lower limit may be paired with any upper limit. The Mn of the modified benzoxazine resin may have a lower limit of any of 1, 2, 5, 10, 20, 30, 50, or 70 kDa, and an upper limit of any of 20, 30, 50, 70, or 100 kDa, where any lower limit can be used in combination with any upper limit.

In some embodiments, substitutional groups may be introduced as pendant groups by a chemical reaction of organic compound(s) with the hydroxyl group of phenols in the polymer structure of the benzoxazine thermoplastic resin. The method by which the substitutional groups may be introduced include, but is not limited to, reaction in solution, melt reaction using extruder, oven, hot press, or autoclave. For example, in order to introduce the substitutional groups, the organic compound(s) may include, but are not limited to, an anhydride, dianhydride, carboxylic halide, or other functional group which can react with a hydroxyl group of the phenol, and so on. For example, the substitutional groups introduced as side pendant(s) of the polymer may include, but are not limited to, an acetyl, phenyl, or other hydrocarbon group, and so on. One or more organic compounds may be used independently or in combination for the substitution. The introduction of the substitutional group may not be achieved fully for all of the hydroxyl groups in the polymer. In one or more embodiments, the introduction of the substitutional group may be 20% or more, 50% or more, or 70% or more of all of the hydroxyl groups in the polymer structure of the benzoxazine thermoplastic resin.

Benzoxazine thermoplastic resins may be cured (crosslinked) in a variety of manners, which include, but are not limited to, a cure cycle, solution casting, hot-melt pressing, and the like, including by external stimuli selected from heat, ultraviolet irradiation, microwave irradiation, moisture, and the like. In some embodiments, one of these external stimuli may be independently used for curing the benzoxazine thermoplastic resins. In some embodiments, two or more stimuli may be used concurrently. In some embodiments, two or more external stimuli may be used separately for purposefully making an initial partially cured (pre-cured) intermediate of the benzoxazine thermoplastic resin, after one or more of the stimuli have been applied, and then fully curing, upon application of the final stimulus. In some embodiments, the selection of the cure mechanism may be determined by the type of article and the way in which the resin is to be used, for example as an impregnator (such as in composite fibers to form a pre-preg), composite, adhesive, coating, etc. For example, prior to curing, the resin may be raised above a pre-cure glass transition temperature ($T_g$) but below the cure temperature so that the crosslinkable thermoplastic resin may be melt-processed into its desired form and then cured to crosslink and solidify the resin.

In one or more embodiments, the crosslinkable thermoplastic resin may contain groups that crosslink together upon application of an external stimulus. In one or more embodiments, the phenol-containing monomer may contain one or more of the groups that are crosslinkable by one or more of the aforementioned external stimuli. In some embodiments, the crosslinkable groups may be introduced into the polymer structure of the crosslinkable thermoplastic resin as pendant groups by a chemical reaction with the hydroxyl group of phenols. Crosslinkable groups may be introduced by a reaction not involving a solvent such as, but not limited to, a melt reaction using an extruder, an oven, a hot press, or an autoclave. In some embodiments, the crosslinkable groups can be reacted with each other to form a crosslinked structure by external stimuli, as discussed above, such as those selected from heat, ultraviolet irradiation, microwave irradiation, moisture, and so on. In some embodiments, these external stimuli may be independently used for curing the crosslinkable thermoplastic resins. In some embodiments, two or more stimuli may be used for curing these crosslinkable thermoplastic resins simultaneously. In some embodiments, two or more external stimuli may be used separately for purposely making a partially cured (pre-cured) intermediate of the crosslinkable thermoplastic resins before fully curing. In some embodiments, compounds with these external stimuli may be used for curing with crosslinkable thermoplastic resins as a crosslinker together. For example, the crosslinkable groups activated by heat may include, but are not limited to, epoxy, benzoxazine, nitrile, bismaleimide, citraconic imide, and other unsaturated hydrocarbon groups such as nadic imide, phenylethynyl, phenylethynyl imide and so on. The crosslinkable groups activated by ultraviolet may include, but are not limited to, acrylic, methacrylic, cinnamic, allyl azide and other unsaturated hydrocarbon groups. In some embodiments, these crosslinkable groups can be used independently. In some embodiments, two or more crosslinkable groups can be used together. Also, for example, the crosslinkable groups activated by microwave irradiation may include, but are not limited to, epoxy and other unsaturated hydrocarbon groups. These crosslinkable groups may be used independently or together. Also, the crosslinkable groups by moisture absorption may include, but are not limited to, cyanoacrylate, isocyanate and alkoxysilanes. These crosslinkable groups may be used with a catalyst for accelerating the cure reaction. These crosslinkable groups may be cured with catalysts that may include inorganic salts, organic compounds, or a combination thereof.

In one or more embodiments, the thermoplastic resin composition may include a functional group that can be cured (crosslinked) via UV and/or microwave treatment, referred to herein as "a curable functional group." Suitable curable functional groups include functionality that is microwave- and/or UV-curable, meaning, upon exposure to UV and/or microwave radiation, crosslinking is triggered in the thermoplastic resin. In the case of microwave radiation, curable functional groups may absorb the radiation to trigger crosslinking. For example, for a compound to be microwave-curable, it may include polar functionality. Thus, such functionality may absorb the radiation, and convert the radiation into heat to trigger curing of the thermoplastic resin composition. In the case of UV radiation, a photoinitiator may absorb UV radiation and generate radicals and/or ions that attack a curable functional group, which triggers crosslinking. In order for a compound to be UV curable, it may include functional groups that are capable of being attacked by radicals and/or ions generated by one or more photoinitiators, and form covalent bonds with other functional groups. In one or more embodiments, the curing may involve reaction of other functional groups present in the thermoplastic resin composition (including but not limited to benzoxazine rings that may ring-open in curing) triggered by the heat generated by the curable functional group or by radicals and/or ions generated by photoinitiators.

In one or more embodiments, the curable functional group is a polar group suitable for absorbing microwave radiation. Examples of types of suitable polar functional groups may include, but are not limited to, carboxylic acids, amides, alcohols, esters, aldehydes, and ketones.

In one or more embodiments, the curable functional group is "UV-sensitive," meaning it is a functional group that is capable of being attacked by radicals and/or ions generated by one or more photoinitiators. Such functional groups may then form covalent bonds with other functional groups (crosslinking). Examples of types of UV sensitive functional groups may include, but are not limited to, functional groups having an activated double bond, such as acrylic, methacrylic, styrene, and vinylpyrrolidone groups.

In one or more embodiments, the curable functional group may be bound to the thermoplastic polymer, which may occur by modification of the thermoplastic polymer by a curing component having such curable functional group or by polymerizing monomers having such curable functional group, i.e., through synthesis of the polymer. In such embodiments, the curable functional group is an internal component, i.e., is covalently bonded to the polymer. Further, it is also envisioned that the polymer may be combined with an external curing component that does not react with the polymer until triggered by the microwave or UV cure.

Thus, in one or more other embodiments, the curing component (prior to reaction with a polymer) may include multiple functionalities, including the curable functional group and at least one functionality that is reactive such that it may bond to a thermoplastic polymer. In such embodiments, the curing component (prior to reaction with a polymer) may function as a raw material to form a polymer having an internal curable functional group. Thus, in addition to polar and/or UV sensitive functionality, the curing component may also include at least one reactive functionality that bonds to the thermoplastic resin composition. Moreover, in addition to the functionality that binds to the polymer prior to the microwave- and/or UV-triggered cure, the curing component may also optionally include at least one additional reactive functional group that is reactive upon the microwave- and/or UV-triggered cure. That is, in one or more embodiments that include at least one additional reactive functional group, the curing component functioning as a raw material (prior to being bound to the polymer, or a monomer in the case of the curable functional group being incorporated by a polymer synthesis mechanism) may have at least two reactive groups, such that upon a first reaction with the polymer or monomer, at least one reactive group remains in the curable functional group. Further, while the curable functional group may include one of such additional reactive functional groups, it is also envisioned that the curable functional group may include at least two of such additional reactive functional groups so that such additional reactive functional groups may result in additional crosslinking.

In one or more embodiments, the reactive functionality is such that it may bond to a thermoplastic polymer and/or undergo crosslinking. Examples of types of functional groups suitable for use as the reactive functionality may include, but are not limited to, phenols, amines, thiols, ethers, esters, acrylates, oxiranes, carbamates, phosphorylates, glycolipids, polyethoxylates, benzoxazines, and derivatives thereof.

Further, it is also understood that a functionality that absorbs microwave radiation or is UV sensitive may also be the reactive functional group, such that upon triggering by the radiation, the group crosslinks the polymer.

It is also envisioned that the radiation may trigger a combination of reactions involving the curable functional group itself as well as the other functional groups that do not absorb and convert the radiation into heat.

However, as mentioned above, if the curing component does not include two reactive functionalities (and the curable functional group bound to the polymer does not also include at least one reactive functionality), the polymer may still crosslink by including other reactive groups, such as reactive end-caps, whose reaction may be triggered by the heat generated from the microwave or by radicals and/or ions emitted by the photoinitiator following UV radiation. In one or more embodiments, the polymer may include benzoxazine end-caps whose cure may be triggered by the microwave radiation. Further, it is also contemplated that the resin composition may include both reactive end-caps as well as curable functional groups that also contain reactive functionality.

Examples of reactive functional groups may include, but are not limited to, epoxides, thiols, amines, and carboxylic acids. Examples of compounds that include such reactive functional groups, and thus may be the curing component, may include, but are not limited to, epichlorohydrin, celloxide 2021P (7-oxabicyclo[4.1.0]heptan-4-yl 2-(7-oxabicyclo[4.1.0]heptan-4-yl)acetate), YDF-170 (a diglycidylether bisphenol A epoxy oligomer), methacrylic anhydride, and 1,1,1-tris(4-hydroxyphenyl)ethane, 4,4'-oxydianiline.

Curable functional groups of the present disclosure may be incorporated into the thermoplastic resin composition using a variety of suitable strategies. In one or more embodiments, the curable functional group may be covalently bonded to the thermoplastic polymer, and as such the polymer includes an internal curable functional group. In other embodiments, the curable functional group is not covalently bonded to the thermoplastic polymer, but rather, is present in an external curing component mixed with the polymer, particularly curable by microwave radiation. In such embodiments, the polymer is not reacted with or bonded to the external curing component until curing is triggered by microwave or UV radiation. Moreover, it is also envisioned that a polymer with an internal curable functional group may be combined with an external curing component and cured.

As mentioned above, in embodiments in which the polymer has a curable functional group is covalently bonded to the thermoplastic polymer (i.e., an internal curable functional group), the curable group may be introduced by covalently bonding directly to the thermoplastic polymer, or by selecting at least one monomer that includes the curable functional group for use in a monomer mixture which is then polymerized to form a thermoplastic polymer.

In embodiments triggered by UV radiation, at least one photoinitiator is also generally present. A photoinitiator is a compound that may convert UV radiation into chemical energy in the form of radicals and/or ions. Types of photoinitiators may include, but are not limited to, benzoin ethers, benzyl ketals, α-dialkoxyacetophenones, α-hydroxyalkylphenones, α-amino alkylphenones, acylphosphine oxides, benzophenones/amines, thioxanthones/amines, and titanocenes.

A schematic depiction of an embodiment of bonding the curable group to the polymer so that the polymer includes an internal curable functional group is shown in FIG. 4. In FIG. 4, a thermoplastic polymer 402 includes a polymer backbone 404 and optional end caps 406. The polymer is modified (indicated by the arrow) such that a curable functional group 408 is covalently bonded to the thermoplastic polymer 402 and the polymer thus includes an internal curable functional group. In the embodiment shown in FIG. 4, the curable functional groups 408 are covalently bonded to the polymer backbone 404. In some embodiments, the curable groups may be covalently boned to the end caps. In some embodiments, curable groups may be covalently bonded to the polymer backbone and the end caps. As may be appreciated by those skilled in the art, the amount of internal curable groups bonded to the polymer may be adjusted to tune the amount of crosslinking in a cured polymer.

In one or more embodiments, a thermoplastic resin including benzoxazine functionality may be utilized as the thermoplastic polymer to which a curable functional group may be bonded. In some embodiments, the thermoplastic polymer may include a ring-opened benzoxazine having phenolic functionality. An example of a ring-opened benzoxazine thermoplastic polymer is shown as structure (1).

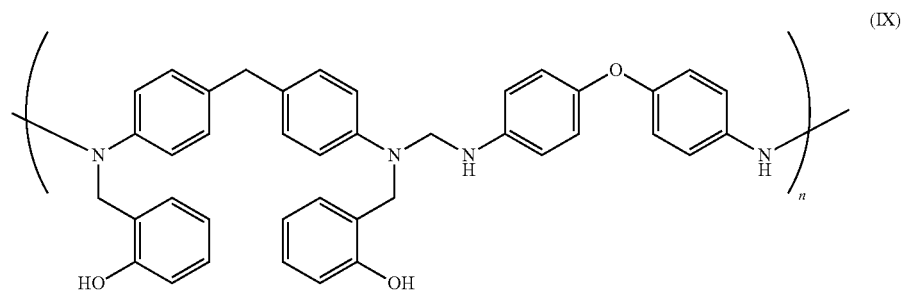

(IX)

The polymer backbone of the structure (IX) may be modified with a curing component such as epichlorohydrin or methacrylic anhydride to form a polymer which includes an internal curable functional group, such as, for example, an epoxide or acrylic group, in accordance with one or more embodiments of the present disclosure. In particular, curing components may react with the phenolic functionality in structure (IX). When the ring-opened benzoxazine shown in structure (IX) is modified with methacrylic anhydride, methacrylic anhydride reacts with the phenolic functionality to form the polymer shown in structure (X).

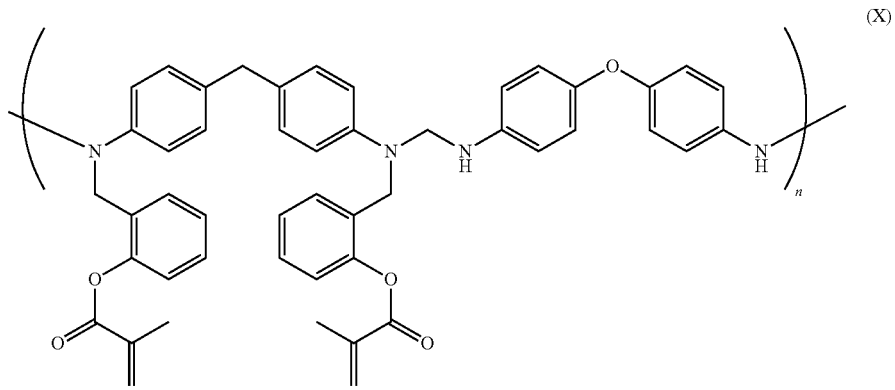

(X)

The polymer shown in structure (X) may be cured via UV treatment (in the presence of a photoinitiator) due to the presence of the curable functional groups, specifically UV-sensitive groups. As shown, these internal functional groups are covalently bonded to the polymer backbone. Further, as may be understood, depending on the amount of curing component reacted with the polymer shown in structure (XI), some portion of the resin may include repeating units of structure (XI) with other repeating units of structure (X). In one or more embodiments, such structures may be end-capped by a benzoxazine group.

When the ring-opened benzoxazine shown in structure (IX) is modified with epichlorohydrin, epichlorohydrin reacts with the phenolic functionality to form the polymer shown in structure (XI).

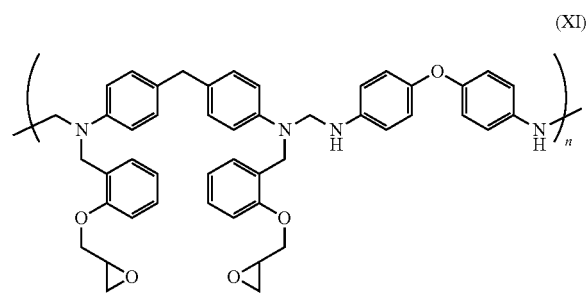

(XI)

The polymer shown in structure (XI) may be cured via microwave treatment due to the presence of the polar curable functional groups. As shown, these internal functional groups are covalently bonded to the polymer backbone. Further, as may be understood, depending on the amount of curing component reacted with the polymer shown in structure (IX), some portion of the resin may include repeating units of structure (IX) with other repeating units of structure (XI). In one or more embodiments, such structures may be end-capped by a benzoxazine group.

In one or more embodiments, the curable functional group may be incorporated into the thermoplastic resin composition by selecting at least one monomer that includes the curable functional group for use in a monomer mixture which is then polymerized to form a thermoplastic polymer. A schematic depiction of this strategy is shown in FIG. 5. In the embodiment shown in FIG. 5, some monomers 504 include curable groups 508. The resultant mixture is then polymerized (indicated by the arrow) to form a thermoplastic polymer 502 that includes the curable groups 508 as an internal curable functional group. The polymer 502 includes optional end caps 506, which are curable functional groups.

In one or more embodiments, the curable functional group may be present in the thermoplastic composition by blending an external curing component that includes the curable functional group with the thermoplastic resin composition. In such embodiments, the curable functional group is not covalently bonded to the thermoplastic polymer, but is present on the external curing component combined with the polymer. Instead, in some embodiments, the curable functional group in the external curing component absorbs microwave radiation, heating the polymer. In such cases, the curable groups may also contain reactive functional groups, and due to the heating generated by the microwave radiation, the thermoplastic polymer may also crosslink with the curable functional group to form a cured (crosslinked) polymer. In one or more embodiments, the curable group may be replaced by a polar and non-curable group. In such cases, the polar and non-curable group absorbs the microwave radiation, converts it to heat, and assists the curing of thermoplastic polymer. In some embodiments, a photoinitiator absorbs UV radiation and generates radicals and/or ions that attack the curable functional group present on the curing component, which covalently bonds with other functional groups in the polymer.

A schematic depiction of a crosslinkable benzoxazine thermoplastic polymer with curable groups covalently bonded to the polymer as internal curable groups is shown in FIG. 6A. The curable groups on the polymer are depicted as circles, and the thermoplastic polymer is a depicted as lines. A schematic depiction of a cured resin of the composition shown in FIG. 6A is shown in FIG. 6B.

A schematic depiction of a crosslinkable benzoxazine thermoplastic polymer with external curable groups that are not covalently bonded to the polymer is shown in FIG. 7A. The curing components that include the curable groups are depicted as circles, and the thermoplastic polymer is a depicted as lines. A schematic depiction of a cured resin of the composition shown in FIG. 7A is shown in FIG. 7B.

The compositions of the present disclosure may be cured by microwave and/or UV-treatment. As may be appreciated by those skilled in the art, appropriate conditions for microwave and UV treatments may be selected based on the properties of the material to be cured, and based on the desired properties of the cured material.

The compositions disclosed herein may be cured via microwave treatment at a suitable time, frequency, and power. In one or more embodiments, a microwave treatment time may be in a range of from 1 minute to 60 minutes. The microwave treatment time may have a lower limit of one of 1 minute, 5 minutes, 10 minutes, 15 minutes, and 20 minutes, and an upper limit of one of 30 minutes, 45 minutes, 50 minutes, 55 minutes and 60 minutes, where any lower limit may be combined with any mathematically compatible upper limit. In one or more embodiments, a microwave treatment frequency may be in the range of from 0.3 to 300 GHz, and a microwave treatment power may be in a range of from 100 W to 100 kW.

The compositions disclosed herein may be cured via UV treatment at a suitable time, wavelength, and power. In one or more embodiments, a UV treatment time may be from 5 seconds to 2 hours. The UV treatment time may have a lower limit of 5 seconds 10 seconds, 30 seconds, 60 seconds, 90 seconds, and 5 minutes, and an upper limit of one of 10 minutes, 20 minutes, 30 minutes, 60 minutes, 90 minutes, and 120 minutes, where any lower limit may be paired with any mathematically compatible upper limit. In some embodiments, a UV treatment wavelength is less than 400 nm. In one or more embodiments, a UV treatment power may be in a range of from 10 W to 1 kW. Such treatments may result in a crosslinked structure as determined by the curable functional groups.

Compositions and methods disclosed herein may be particularly useful as compared to conventional thermal curing of resins because UV and microwave curing may require less curing time, less energy input for curing, and more flexibility in processing of the compositions. For example, microwave curing may enable free-standing post-curing strategies, and UV curing allows for greater ease in processing in surface coatings and UV patterning applications.

In one or more embodiments, the crosslinkable benzoxazine resin may be formulated with additives and tougheners made from thermoplastics, thermosets, inorganic salts, organic compounds and so on. The formulation can be performed by a powder dry mixing, melt mixing, or mixing in solution. The shapes of both the additives and the tougheners may involve, but are not limited to, particles, plates, fibers, and so on. In one or more embodiments, the crosslinkable benzoxazine resin may be reinforced by fibers. The reinforcement can be performed by solution coating, melt coating, impregnation, and so on. The shapes of the reinforcement fibers may involve, but are not limited to, single filaments such as short fibers, continuous fibers, comingled fibers (yarn), tows, woven, bundles, sheets, nits, and so on, for making prepregs to mold fiber reinforced composites. Continuous fibers may further adopt any of unidirectional, multi-directional, non-woven, woven, knitted, stitched, wound, and braided configurations, as well as swirl mat, felt mat, and chopped-fiber mat structures. The composition of the fibers may be varied to achieve the required properties for the final composite structure. Exemplary fiber materials may include, but are not limited to, glass, carbon, graphite, aramid, quartz, polyethylene, polyester, poly-p-phenylene-benzobisoxazole (PBO), boron, polyamide, graphite, silicon carbide, silicon nitride, and combinations thereof. One or more additives, tougheners, and reinforcements may be formulated with the crosslinkable thermoplastic resin together. For example, one or more thermoplastic resins can be formulated with the crosslinkable benzoxazine resin together. Such thermoplastic resins may include, but are not limited to, PEEK, PPS, PEI, PC, polysulfone, and so on. In another example, one or more thermosets can be formulated with the crosslinkable thermoplastic resin together and thermally co-cured. Such thermosets may include, but are not limited to, epoxy, benzoxazine, bismaleimide, cyanate ester, and so on. It is also envisioned that the thermoplastic and the thermosets can be used together with the crosslinkable thermoplastic resins of the present disclosure. In one or more embodiments, inorganic salts, organic compounds, and any combination thereof may be also used with the crosslinkable thermoplastic resin so as to lower the curing temperature and control melt viscosity. For example, the organic compound may include a functional group such as, but not limited to, an amino group, imidazole group, carboxylic group, hydroxy group, sulfonyl group, and so on.

The shape of the crosslinkable benzoxazine resin may be, but is not limited to, a powder, film, chunk, fiber, and so on. The film, chunk, and fiber can be thermally made by a casting or press molding method using the powder or solution of the crosslinkable thermoplastic resin. The molded articles can be thermally remolded by a casting or press molding method at lower temperature when the crosslinking is started. The molded articles can be remolded by a casting or press molding method when using partially cured crosslinkable benzoxazine resins.

In one or more embodiments, the crosslinkable benzoxazine resin may be thermally cured in the temperature range of about 120 to 260° C. The crosslinkable benzoxazine resin may be subjected to a longer period of curing time at the lower end of the temperature range, and a shorter period of time at the upper end of the temperature range, based on the desired application. In some embodiments, the cure temperature of the crosslinkable benzoxazine resin may be of a range having a lower limit of one of 120, 130, 140, 150, 160, and 180° C., and an upper limit of one of 160, 170, 180, 190, 200, 220, 240, and 260° C., where any lower limit may be paired with any upper limit.

In one or more embodiments, the crosslinkable benzoxazine resin may be thermally cured for a time in a range of 30 min to 5 hours. In some embodiments, the cure condition may involve several continuing steps.

In one or more embodiments, the crosslinkable benzoxazine resin may have a pre-cure $T_g$ of the range of about 80 to 120° C. For example, the crosslinkable thermoplastic resin may have a pre-cure $T_g$ that is of a range having a lower limit of any of 80, 90, 100, and 110° C., and an upper limit of any of 90, 100, 110, and 120° C., where any lower limit can be used in combination with any upper limit.

In one or more embodiments, the crosslinkable benzoxazine resin may have a post-cure $T_g$ of the range of about 110 to 250° C. For example, the crosslinkable benzoxazine resin may have a post-cure $T_g$ that is of a range having a lower limit of any of 110, 130, 150, 170, and 190° C., and an upper limit of any of 140, 160, 180, and 250° C., where any lower limit can be used in combination with any upper limit.

In one or more embodiments, the pre-cure and post-cure $T_g$ values of the crosslinkable benzoxazine resin may have a differential of 20° C. or more, 50° C. or more, or 70° C. or more. For example, the crosslinkable benzoxazine resin may have pre-cure and post-cure $T_g$ values having a differential of a range having a lower limit of any of 20, 25, 30, 40, 50, 60, and 70° C., and an upper limit of any of 40, 50, 60, 70, and 90° C., where any lower limit can be used in combination with any upper limit. This differential may allow for melt-processing of the resin to occur prior to curing the resin.

In one or more embodiments, the cured crosslinkable benzoxazine resin may have a 5% decomposition temperature $Td_{5\%}$ of 200° C. or more, 250° C. or more, or 300° C. or more, 350° C. or more, or 400° C. or more, in accordance with ASTM E1131. For example, the cured crosslinkable benzoxazine resin may have a $Td_{5\%}$ value of a range having a lower limit of any of 200, 225, 250, 275, 300, 325, 350, 375, 400, and 425° C., and an upper limit of any of 300, 350, 375, 400, 425 and 450° C., where any lower limit can be used in combination with any upper limit.

In one or more embodiments, the cured crosslinkable benzoxazine resin may have a modulus ranging from about 2.0 to 4.0 GPa in accordance with ASTM D1708. For example, the cured crosslinkable benzoxazine resin may have a modulus of a range having a lower limit of any of 2.0, 2.2, 2.5, 2.7, 2.9, 3.0, and 3.2 GPa, and an upper limit of any of 3.0, 3.2, 3.4, 3.6, 3.8, and 4.0 GPa, where any lower limit can be used in combination with any upper limit.

In one or more embodiments, the cured crosslinkable benzoxazine resin may have a tensile strength, in accordance with ASTM D1708, that ranges from about 15 to 100 MPa. For example, the cured crosslinkable benzoxazine resin may have a tensile strength, in accordance with ASTM D1708, of a range having a lower limit of any of 15, 30, 40, 50, 60, 70, and 80 MPa, and an upper limit of any of 40, 50, 60, 70, 80, 90, and 100 MPa, where any lower limit can be used in combination with any upper limit.

In one or more embodiments, the cured crosslinkable benzoxazine resin may have an elongation-at-break that ranges from about 1 to 10%, in accordance with ASTM D1708. For example, the cured crosslinkable benzoxazine resin may have an elongation-at-break of a range having a lower limit of any of 1, 1.5, 2.0, 2.5, 3.0, and 4.0%, and an upper limit of any of 1.5, 2.0, 2.5, 3.0, 3.5, 4.0, 5.0, and 10%, where any lower limit can be used in combination with any upper limit.

In the formation of a coating or adhesive layer, application of the formulated coating can be made via conventional methods such as spraying, roller coating, dip coating, and so on, and then the coated system may be cured including, but not limited to, by baking or irradiation such as, but not limited to, microwave, UV or IR.

EXAMPLES

The following examples are merely illustrative and should not be interpreted as limiting the scope of the present disclosure.

Materials

A P-d-type benzoxazine monomer (product name: P-d) was obtained from Shikoku Chemicals Corporation. 2-Methylresorcinol (MR), 4,4'-oxydianiline, 3,3'-dimethyl-bisphenol A (BBPA), methacrylic anhydride, 2,2-Dimethoxy-2-phenylacetophenone (DMPA), vinylpyrrolidone (VP), tetrahydrofuran (THF), epichlorohydrin, sodium hydroxide, 1,1,1-tris(4-hydroxyphenyl)ethane (THPE), and 4,4'-Oxydianiline (ODA) were purchased from Sigma Aldrich. 2-Methoxyethanol, methanol, and acetic anhydride were also purchased from Sigma Aldrich and VWR Chemicals. 2,2'-Diallyl bisphenol A (Product name: DABPA) was obtained from Daiwakasei Industry Co.

Methods

Differential scanning calorimetry (DSC) measurements were carried out using a Q2000 (TA Instruments) at 20° C./min in a 50 mL/min $N_2$ flow. Tg was measured from an onset of a baseline shift (intersection of two tangent lines before and after an inflection point).

Dynamic mechanical analysis (DMA) measurements were conducted using a Q800 (TA Instruments) at 5° C./min in an air flow, a frequency of 1.0 Hz, and a strain of 0.3%. Tg was measured from an onset of a storage modulus curve (intersection of two tangent lines before and after an inflection point).

Melt viscosity was measured using a rheometer (DHR-2, TA instruments) with a heating rate of 5° C./min, an angular frequency of 6.283 rad/s (1.0 Hz), and a strain of 0.1%. A parallel plate having a 25 mm diameter was used. Measurements were carried out in air.

Gel permeation chromatography (GPC) measurements were conducted using a GPC system (PROMINENCE, manufactured by Shimadzu Corporation). For molecular weight measurements, N-methyl pyrrolidone was used as an eluent with a flow rate of 0.6 mL/min with four GPC columns (PHENOGEL 5 µm 10E4 Å, PHENOGEL 5 µm 10E3 Å, PHENOGEL 5 m 100 Å, and PHENOGEL 5 µm 50 Å, manufactured by Phenomenex, Inc). A relative molecular weight was calibrated using a polystyrene standard manufactured by TOSOH Corporation.

Thermogravimetric Analysis (TGA) was carried out using Q50 TGA from TA Instruments at 5° C./min in a 40 ml/min $N_2$ flow. $T_{d5}$ was measured at the temperature where 5% weight loss was observed.

Solution casting thin films were prepared by dissolving resins in DMF with a solid content of 20~60 wt. %. The DMF solutions were casted on a surface-treated glass substrate and then coated by doctor blade. The film was then dried in a convention oven at 80° C. for 1 h, and then cured at 160° C. for 1 h, 185° C. for 3 h, and 218° C. for 1 h. The cured film was peeled off the glass substrate after curing.

Thin films were molded using a hydraulic hotpress under the influence of heat and pressure. A fiberglass/Teflon film with a thickness of 150 microns was used as a release film to mold the thin films. A base layer of the fiberglass/Teflon film measuring 6×12 inches was first placed on a steel plate. On a separate release film with the same dimensions as the base layer, three strips measuring 250 mm×5 mm were cut into the film at the distance of 25 mm apart, with the release film serving as the frame or spacer for the molding and placed on top of the base layer. Powdered resin was measured and poured evenly along the length of each of the three strips. The steel plate was then placed on the bottom platen of the heat press, which was preheated to 135° C. Upon melting of the resin (as confirmed by visual observation) a third and top layer of release film was placed on the frame and a pressure of 2 MPa was applied initially through a series of 20 bumps. The part was then held at a constant pressure of 2 MPa for the remainder of the molding cycle, as follows: 1) ramp to 160° C. at 5° C./min and hold for 60 mins, 2) ramp to 185° C. at 5° C./min and hold for 180 mins, 3) ramp to 218° C. at 5° C./min and hold for 60 mins, and 4) cool down to room temperature at 5° C./min. Upon cooling, the thin film strips were carefully separated from the release films and then cut into the appropriate length for required for tensile testing and DMA measurements.

Solubility in THF was tested by adding about 25 mg of the material being tested to about 5 mL of THF. The mixture was then sonicated for about 5 minutes.

UV-curing was performed using either a hand-held lamp or a UV-curing machine. The hand-held UV curing lamp was obtained from VWR and has a wavelength of 365 nm, a current of 0.16 Amps and a voltage of 110 V. The UV curing machine is a Heraeus LC6B Lighthammer with wavelengths in the range of 200 to 400 nm and a power of 467 watts/inch.

Synthesis and Purification of Ring-Opened Crosslinkable Thermoplastic Made From P-d Benzoxazine and Resorcinol in 2-Methoxyethanol (Example 1)

Selected amounts of P-d and MR were mixed in 2-methoxyethanol at a molar ratio of 1.5:1. After mixing, the mixture was heated to 70° C. for 95 hours. After reaction was cooled down to room temperature, no solid precipitated out of solution. According to the GPC result shown in FIG. 8, the Mw obtained from this reaction was 4359 Da (calibrated), and the Mn was 1552 Da (calibrated), indicating that 2-methoxylethanol is an effective solvent for synthesizing a ring-opened crosslinkable benzoxazine resin.

Precipitation was next performed by directly dropping the solution in a methanol to precipitate out the high molecule weight component. The GPC result of the purified product shown in FIG. 9 showed a Mw of 7081 Da (calibrated) and a Mn of 2802 Da (calibrated), indicating effective removal of unreacted monomers and most oligomers.

Figure 10:
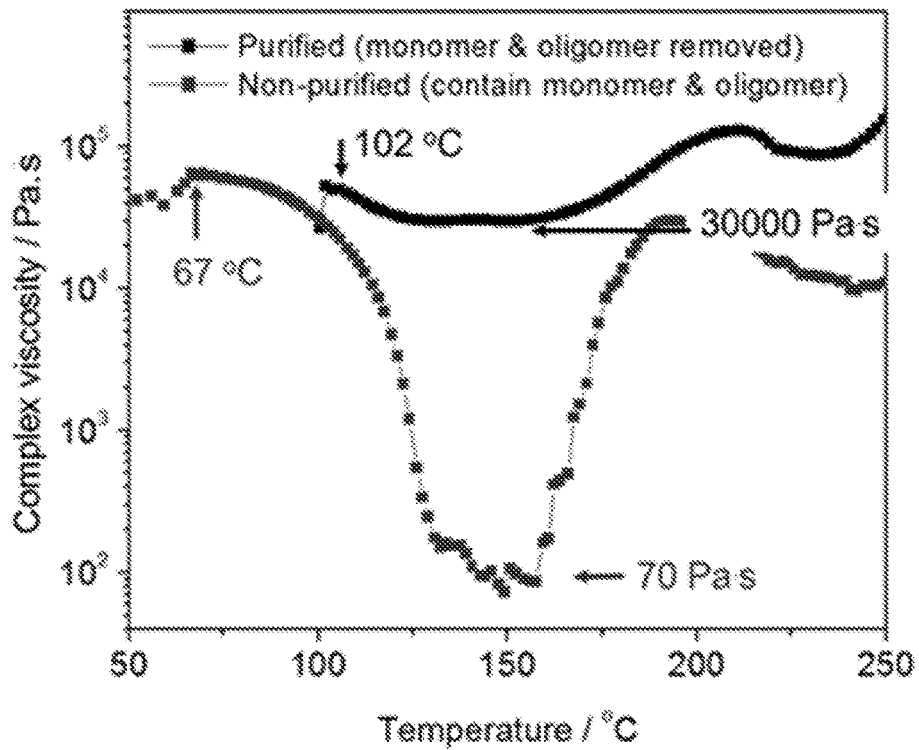
FIG. 10 depicts the rheological behavior of exemplary thermoplastic resin compositions of one or more embodiments.

Rheology data, shown in FIG. 10, indicates the minimum melt viscosity for non-purified sample was 30000 Pa·s, while the minimum melt viscosity for the purified sample was 70 Pa·s.

Synthesis and Purification of Ring-Opened Crosslinkable Thermoplastic Made From P-d Benzoxazine and Resorcinol in Ethyl Acetate (Example 2)

Figure 11:
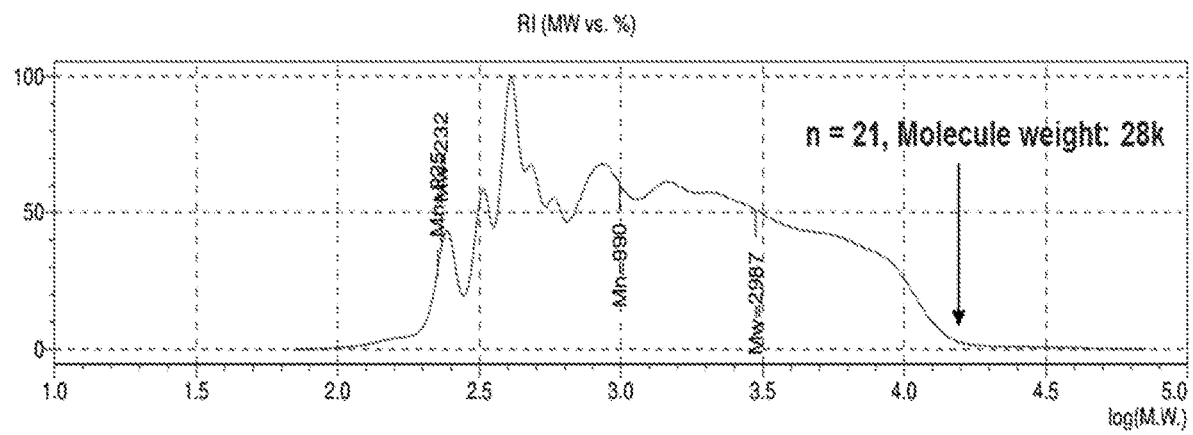
FIG. 11 depicts GPC data for exemplary thermoplastic resin compositions of one or more embodiments.

Selected amounts of P-d and MR were mixed in ethyl acetate at a molar ratio of 1.5:1. After mixing, the mixture was heated to 70° C. for 95 hours. After reaction was cooled down to room temperature, no solid precipitated out of solution. According to the GPC result shown in FIG. 11, the Mw obtained from this reaction was 5376 Da (calibrated), and the Mn was 1782 Da (calibrated), indicating that ethyl acetate is an effective solvent for synthesizing a ring-opened crosslinkable benzoxazine resin.

Acetylation of Purified Ring-Opened Crosslinkable Thermoplastic Made from P-d Benzoxazine and Resorcinol (Example 3)

The purified resin (10 g) according to Example 1 was combined with 31.5 g of sodium bicarbonate and 5 g of acetic anhydride in 100 mL of THF. The mixture was allowed to react for 24 hours, and the reaction product was precipitated in water followed by washing with methanol.

Figure 12:
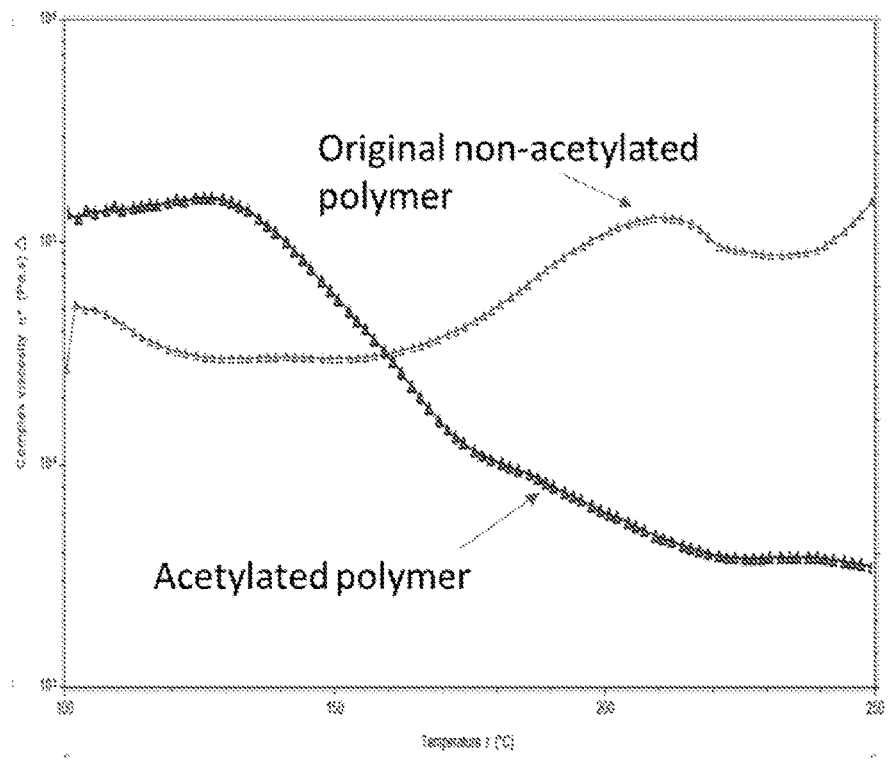
FIG. 12 depicts the rheological behavior of exemplary thermoplastic resin compositions of one or more embodiments.
Figure 13:
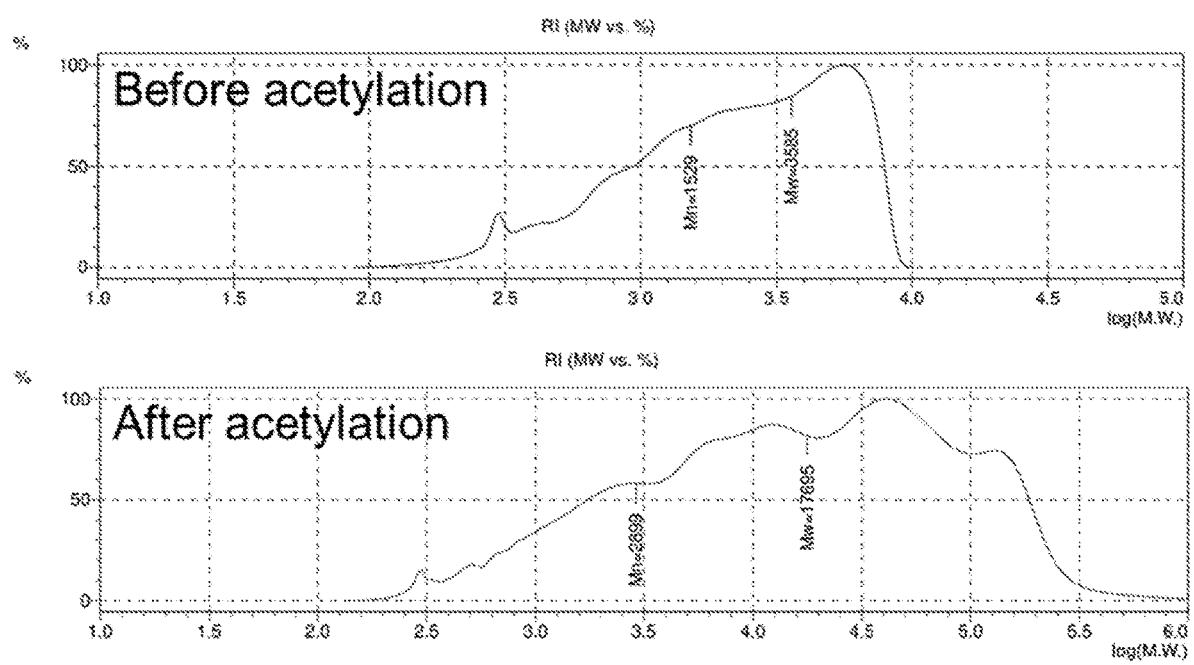
FIG. 13 depicts GPC data for exemplary thermoplastic resin compositions of one or more embodiments.
Figure 14:
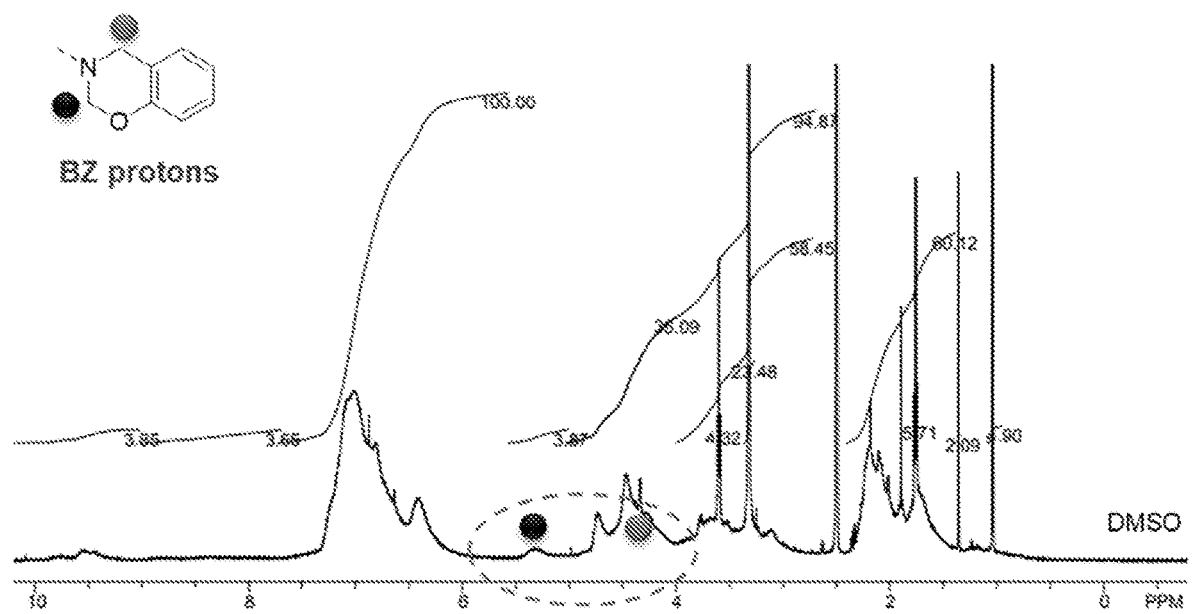
FIG. 14 depicts $^1$HNMR data for exemplary thermoplastic resin compositions of one or more embodiments.

The acetylated resin showed a different viscosity behavior, as shown in FIG. 12, compared to the resin before acetylation. GPC results, shown in FIG. 13, indicate that the acetylation may also result in some ring-opening of the terminal BZ groups, as evidenced by the increase in molecular weight of the acetylated product. The structure of the acetylated product was verified by NMR test, shown in FIG. 14, which shows a very weak proton signal near 10 ppm that represents phenols. In addition, the typical signals from the methylene of the end-terminated benzoxazine functional groups at 4.5 ppm and 5.4 ppm also become weaker, indicating that at least a portion of the benzoxazine functional groups have been ring-opened.

Figure 15:
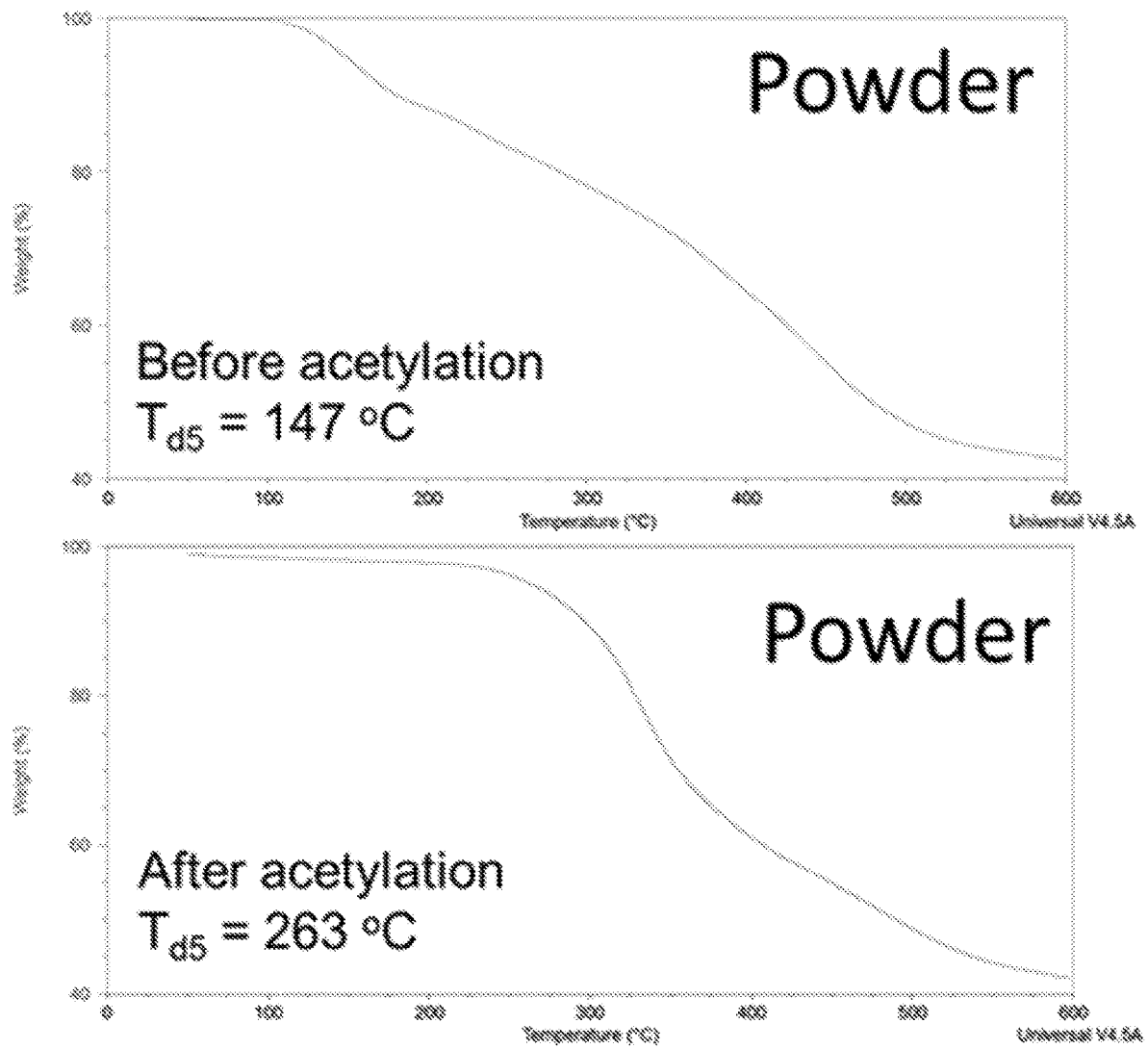
FIG. 15 depicts TGA results for exemplary thermoplastic resin compositions of one or more embodiments.

TGA results (FIG. 15) showed that the acetylated product has improved thermostability compared to the original resin, with an increase in Tas from 147° C. to 263° C. after acetylation.

With the improved processability, the acetylated product was processed into thin films via a coating approach for DMA and tensile tests. To prepare the cured film specimen, the resin in DMF solution (25% weight percentage) was coated on glass substrate. The coat was dried and cured following such condition: 80° C. for 2 hrs, 120° C. for 1 hr, 150° C. for 30 mins, 200° C. for 30 mins, 240° C. for 1 hr, and 260° C. for 15 mins. According to the DMA result, the Tg of the cured film was 198° C. The $T_{d5}$ of the cured film was 310° C., which was a significant increase compared to the powder (263° C.). The properties of the cured film made from the acetylated resin are summarized in Table 1 below and compared with the properties of the original resin (in powder form) used as raw material for acetylation.

TABLE 1

| Properties | Original resin | Acetylated resin |
|---|---|---|
| Molecular weight (GPC/THF) | Mn = 1529 Da | Mn = 2899 Da |
| | Mw = 3585 Da | Mw = 17695 Da |
| Solubility in THF or DMF | Poor | Very good |
| Melt viscosity (minimum) | 22,000 Pa · S (No melting) | 4000 Pa · S (214° C.) |
| Tg (cured powder, by DSC) | 172° C. | 149° C. |
| Tg (cured film, by DMA) | — | 198° C. |
| $T_{d5}$ (Powder) | 147° C. | 263° C. |
| $T_{d5}$ (film) | — | 310° C. |
| Average tensile strength (MPa) | Not measured | 34.04 (Max. 51.67) |
| Average modulus (GPa) | Not measured | 3.26 (Max. 3.7) |
| Average elongation (%) | Not measured | 1.12 (Max. 1.83) |

Synthesis of Ring-Opened Crosslinkable Thermoplastic Made from P-d Benzoxazine and 4,4'-Oxydianiline in 2-Methoxyethanol (Example 4)

Figure 16:
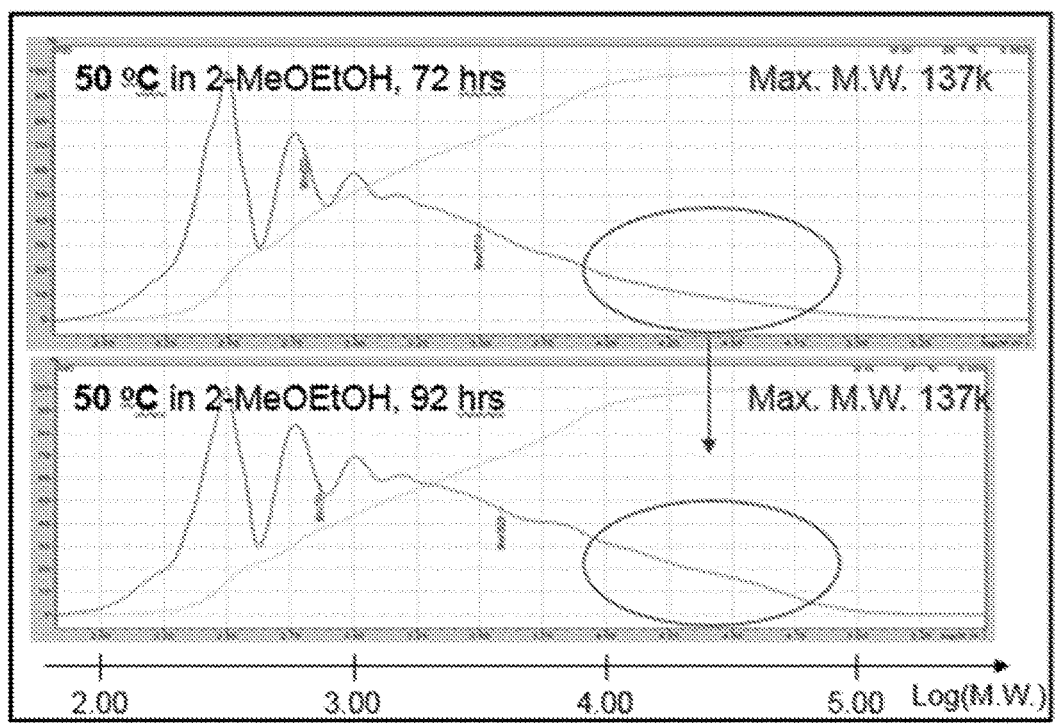
FIG. 16 depicts GPC data for exemplary thermoplastic resin compositions of one or more embodiments.

Selected amounts of P-d and 4,4'-oxydianiline were mixed in 2-methoxyethanol at a molar ratio of 1.5:1. After mixing, the mixture was heated to 50° C. for 92 hours. After reaction was cooled down to room temperature, no solid precipitated out of solution. GPC results after 72 hours and 92 hours are shown in FIG. 16.

Synthesis of PBB (Example 5)

Figure 17A:
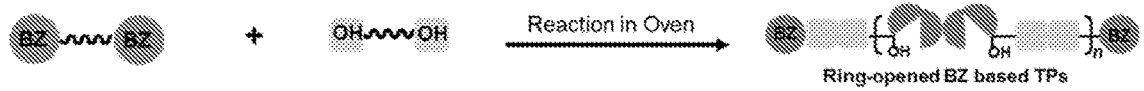
FIGS. 17A-B are schematic representations of the synthesis of exemplary crosslinkable thermoplastic resins of one or more embodiments.
Figure 17B:
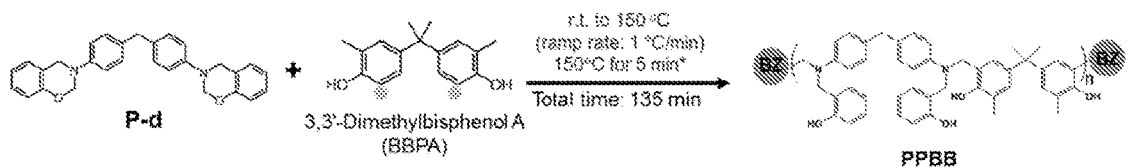

A general illustration of the synthetic process of one or more embodiments is provided by FIG. 17A. The synthesis of Example 1 is specifically depicted by FIG. 17B, and involves the melt polymerization of a bis-BZ (P-d) and 3,3'-dimethylbisphenol A (BBPA). Predetermined amounts of P-d and BBPA powders were mixed in THF, and the mixture was stirred for 2 h. After stirring, THF solvent was removed by rotary evaporation and followed by drying in a vacuum oven overnight. For the purpose of these experiments, P-d/BBPA with group A was defined for a molar ratio of 1.2-1, and group B was defined for a 1-1 molar ratio. The P-d/BBPA powder mixture was placed into a disposable Al pan, and the pan was put into a convection oven for polymerization. The reaction condition was controlled by three parameters: ramp rate, isothermal temperature, and time. The molecular weight was tuned by varying the isothermal temperature and time. Oligomers were generated under an isothermal condition of 120° C. for 30 min (PBB (120-2-30)A). When isothermal at 150° C. for 5 min, the polymer had a medium MW (PBB(150-2-5)A). A higher MW was achieved at an isothermal condition of 150° C. for 10 min (PBB(150-2-10)A). When further extending the isothermal time to 25 min, a partially crosslinked polymer (PBB(150-2-25)A) was generated. PBB resin is a mixture of monomers, oligomers, and polymers.

Synthesis of PPBB (Example 6)

GPC results indicate that PBB resin is a mixture of monomers, oligomers and polymers. Further purification was applied to remove those monomers and oligomers to provide a pure thermoplastic polymer PPBB. This purification was performed by dissolving PBB into THF, and subsequently adding methanol to yield the polymer as a precipitate. The polymer was collected through centrifugation and then dried in a vacuum oven for 24 h.

Synthesis of Acetylated PPBB(A-PPBB) (Example 7)

PPBB powder (1 g, 5.8 mmol —OH) was dissolved into 50 mL of THF. $AcO_2$ (29 mol) and $NaHCO_3$ (11.6 mol) were added into the above mixture. The THF solution was stirred at room temperature for 3 days. After completion of the reaction, the mixture was filtered, and the filtrate was concentrated. To the residue, dichloromethane (50 mL) and water (15 mL) were added, and the phases were separated. The organic phase was dried ($Na_2SO_4$) and concentrated. The final powder was dried in vacuum oven at 60° C. overnight.

Synthesis of PDA (Example 8)

Figure 18:
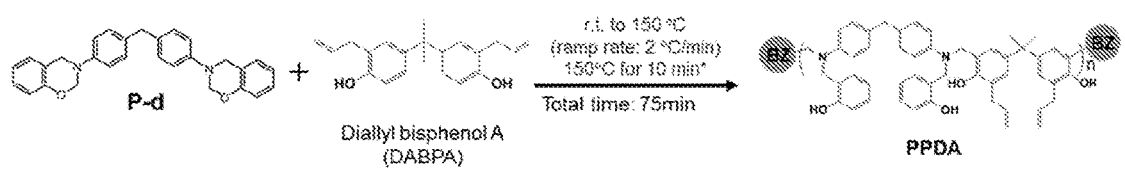
FIG. 18 is a schematic representation of the synthesis of exemplary crosslinkable thermoplastic resins of one or more embodiments.

The synthesis of Example 8 is depicted in FIG. 18, and involves the melt polymerization of P-d and diallylbisphenol A (DABPA). P-d and DABPA were directly mixed in a molten state at 75° C. PDA polymers were synthesized used the same method as PBB. PDA resins with different molecular weights were obtained through tuning the reaction condition.

Synthesis of PPDA (Example 9)

PPDA was obtained through purification of PDA using the same method as PPBB (Example 7).

Results and Discussion of Example 5-9

Figure 19:
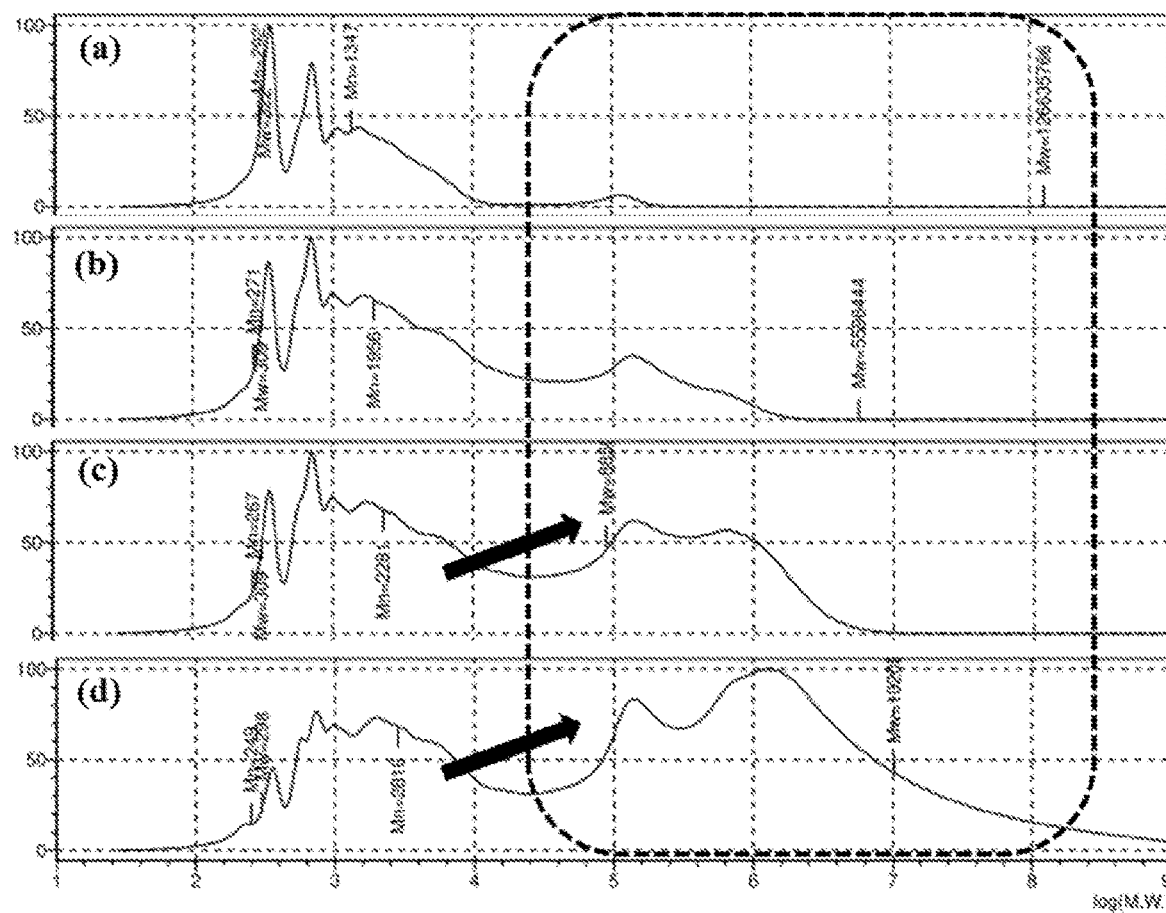
FIG. 19 depicts gel permeation chromatography (GPC) data for exemplary thermoplastic resin compositions of one or more embodiments ((a) PBB(120-2-30)A, (b) PBB(150-2-5)A, (c) PBB (150-2-10)A and (d) PBB(150-2-25)A).

GPC was used to characterize the melt polymerization product obtained from the reaction of P-d/BBPA mixtures with various molar ratios: 2.6-1.0, 1.5-1.0, 1.2-1.0, 1.0-1.0, and 0.6-1.0 under a condition of heat from 20° C. to 150° C. at a heating rate of 1° C./min and isothermal for 10 min at 150° C. All of the obtained products successfully generated oligomers and polymers under the heating condition, but unreacted monomers were also present. With increasing the amount of P-d monomer, the intensity of unreacted P-d peaks also increased. P-d/BBPA mixtures having a molar ratio of 1.2-1.0 and 1.0-1.0 generated PBB with the highest molecular weight. It was also found that, with increasing isothermal time, polymer molecular weight became higher. This indicates that, through controlling the isothermal time, the molecular weight of the polymer can be adjusted. FIG. 19 shows examples of GPC results of PBB obtained under different conditions.

Figure 20:
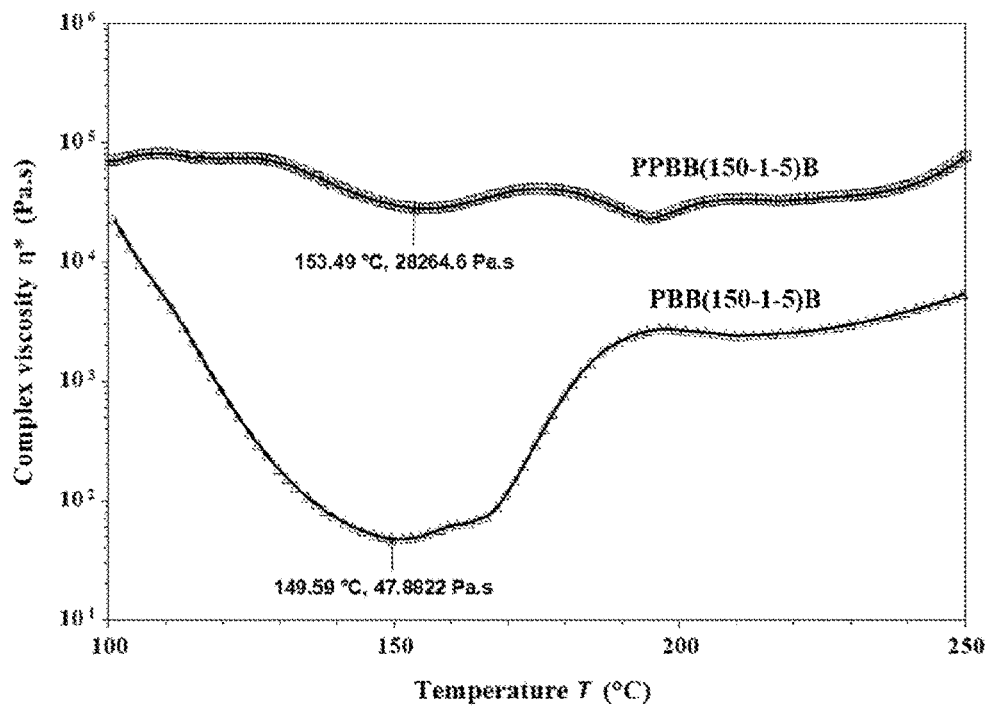
FIG. 20 depicts the rheological behavior of exemplary thermoplastic resin compositions of one or more embodiments.

GPC results indicate that the product after polymerization has unreacted monomers and oligomers. Further purification was applied to remove those monomers and oligomers to get pure thermoplastic polymers. The purification process was performed by dissolving the product into THF, and then adding methanol to precipitate polymer out. The polymer was collected through centrifugation. After drying in an oven, the purified polymer PPBB became insoluble in THF. It is theorized that the insolubility of PPBB results from strong intermolecular hydrogen bonding. PBB and PPBB also showed different viscosity behavior as depicted by FIG. 20. PBB had a viscosity as low as 48 Pa·s, while PPBB had a viscosity as low as 28264 Pa·s at 153° C. The significant drop in viscosity comes from the small amount of monomers and oligomers.

PPBB has an abundance of hydroxyl groups on the backbone. Further modification of those hydroxyl groups by acetyl groups can block the intermolecular hydrogen bonding, which would otherwise occur, to improve the solubility of PPBB. The acetylation reaction was done using $NaHCO_3$ as a catalyst and acetic anhydride as an acetylation reagent. After the acetylation reaction, a new peak at 1.9 ppm appeared in the NMR data, which can be attributed to the methylene proton of acetate, indicating that acetylation successfully occurred with PPBB and that A-PPBB was generated as a result of the reaction. A-PPBB powder was fully dissolved into THF at a solid content of ~25 wt %. GPC results show that A-PPBB has a higher molecular weight than PPBB due to the addition of acetyl groups. Compared to PPBB, A-PPBB has a much lower viscosity of 200 Pa·s at 153° C., and its lowest viscosity occurs at 220° C. with a value of 2 Pa·s.

Figure 21:
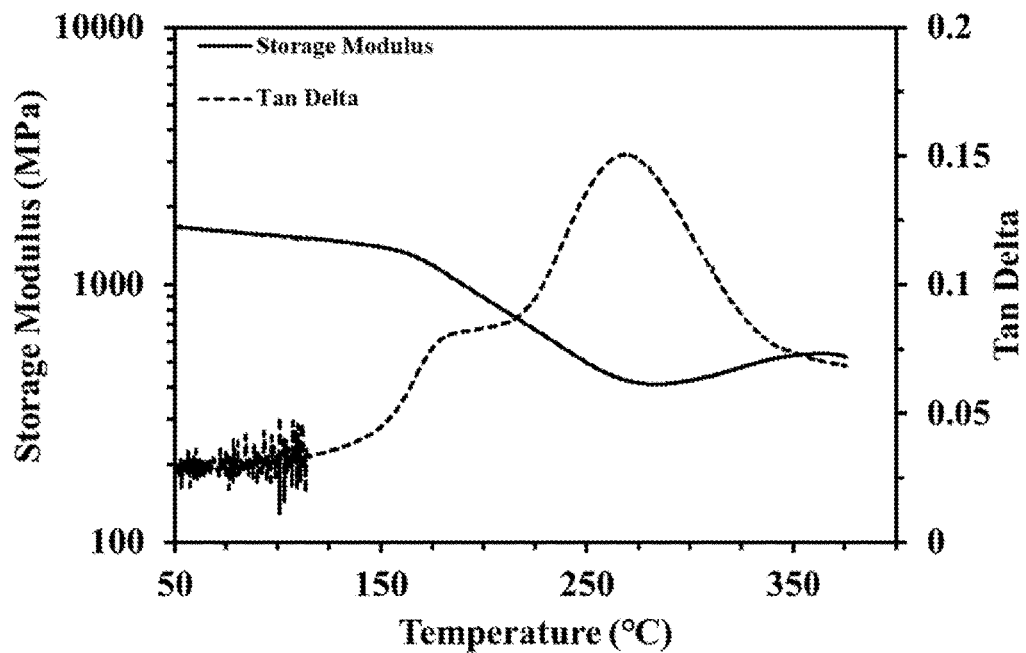
FIG. 21 is a graphical representation of the DMA results of an exemplary cured thermoplastic resin composition of one or more embodiments.

PPBB is a crosslinkable thermoplastic. The end-terminated BZ rings can further react with another BZ ring or phenol group on the backbone to form a crosslinked structure. Cured PPBB thin films were prepared through a solution casting method. A DMF solution with 25 wt. % of PPBB(150-1-5)B was casted on a surface-treated glass substrate. The film was dried at 80° C. for 1 h and 160° C. for 1 h, and then post cured at 185° C. for 3 h and 218° C. for 1 h. DMA results (FIG. 21) show cured PPBB has a Tg of 163° C. The tensile properties of cured PPBB are shown in Table 1, including a tensile modulus of 3.31 GPa and tensile strength of 31.64 MPa. This film is very brittle, and its tensile strength has a huge standard deviation. The elongation-at-break is only 1.2%. Thermoset P-d has a modulus of 3.12 GPa, tensile strength of 82.08 MPa, and elongation-at-break of 3.23%. Compared with P-d, the tensile strength and elongation-at-break of cured PPBB has a significant drop.

TABLE 2

Tensile Properties of PBB (Example 5) and PPBB (Example 6)

| | Tg (DMA) (° C.) | Modulus (GPa) | Tensile strength (MPa) | Elongation at break (%) |
|---|---|---|---|---|
| Cured PPBB (150-1-5)B | 163 | 3.31 ± 0.33 | 31.64 ± 15.73 | 1.20 ± 0.41 |
| Cured PBB (150-1-5)B | 166 | 3.29 ± 0.19 | 55.40 ± 8.22 | 1.87 ± 0.42 |

Figure 22:
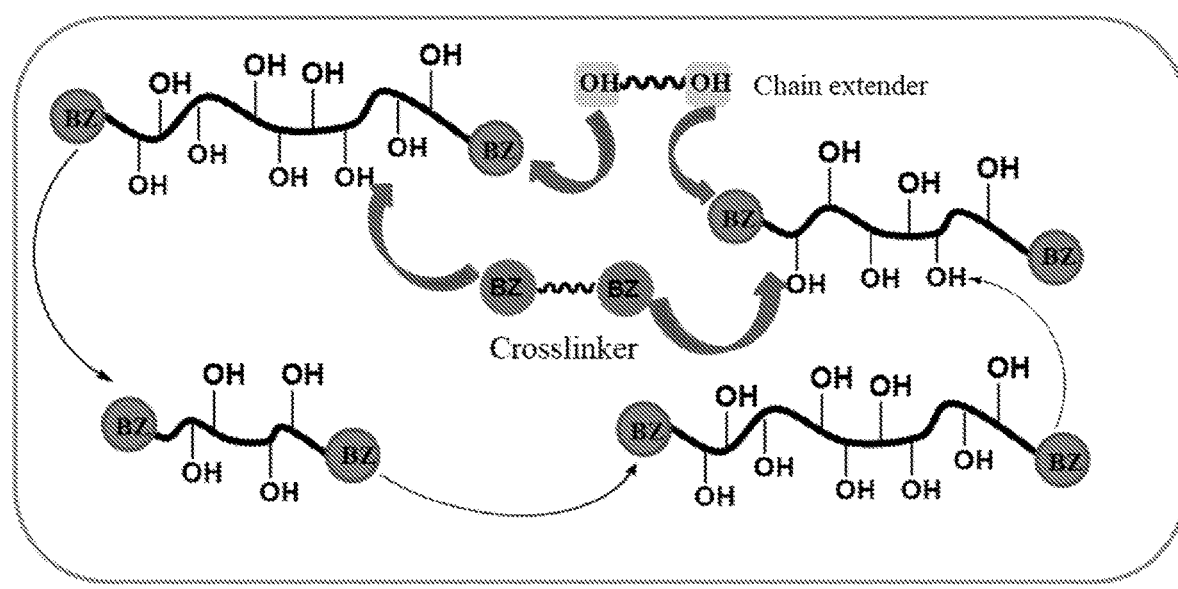
FIG. 22 is a schematic illustration of the reactions between monomers and polymers during the curing of a thermoplastic resin of one or more embodiments.

The tensile properties of cured PBB are listed in Table 2. The cured PBB(150-1-5)B has similar modulus to the cured PPBB, but it has a higher tensile strength (75% improvement) and elongation-at-break (56% improvement). A possible reason for this improvement in tensile strength and elongation-at-break is that the unreacted BBPA works as a chain extender to improve molecular weight, and P-d acts as a crosslinker to further crosslink polymers (FIG. 22). Importantly, the skipped purification process did not compromise the mechanical properties of cured resin. On the other hand, it made the composite application more practical.

Another formulation based on DABPA and P-d was produced through a non-solvent mixing method. The advantages of using DABPA instead of BBPA as a counter monomer include: 1) non-solvent mixing with P-d, 2) introduction of allyl groups into the final polymer, which can further crosslink with BMI, and 3) the ability to formulate with acrylate monomer through allyl groups, which broadens the curing method from thermal curing to UV curing. DABPA is a liquid at room temperature and was directly mixed with P-d powder at 75° C. The polymerization mechanism between P-d/DABPA is similar as P-d/BBPA, as seen through the DSC results. Therefore, a similar melt polymerization condition was applied to P-d/DABPA. Several heating rates were tested for P-d/DABPA: 1° C./min, 2° C./min, and 5° C./min. The obtained products were characterized by GPC and a solubility test in THF. It was found that, under 2° C./min, the polymer had the largest molecular weight and fully dissolved in THF. Under 1° C./min, the monomers took a longer time to diffuse and react, such that the polymer formed a longer molecular chain, resulting in insolubility in THF. Under 5° C./min, the increased heating rate meant that monomers did not have enough time to diffuse and react. Polymers with a short chain were formed. The isothermal time and temperature were also tuned to get the best reaction condition. It was found that under a 2° C./min ramp rate, isothermal at 150° C. for 10 min produced the highest MW of 1M Da.

Figure 23:
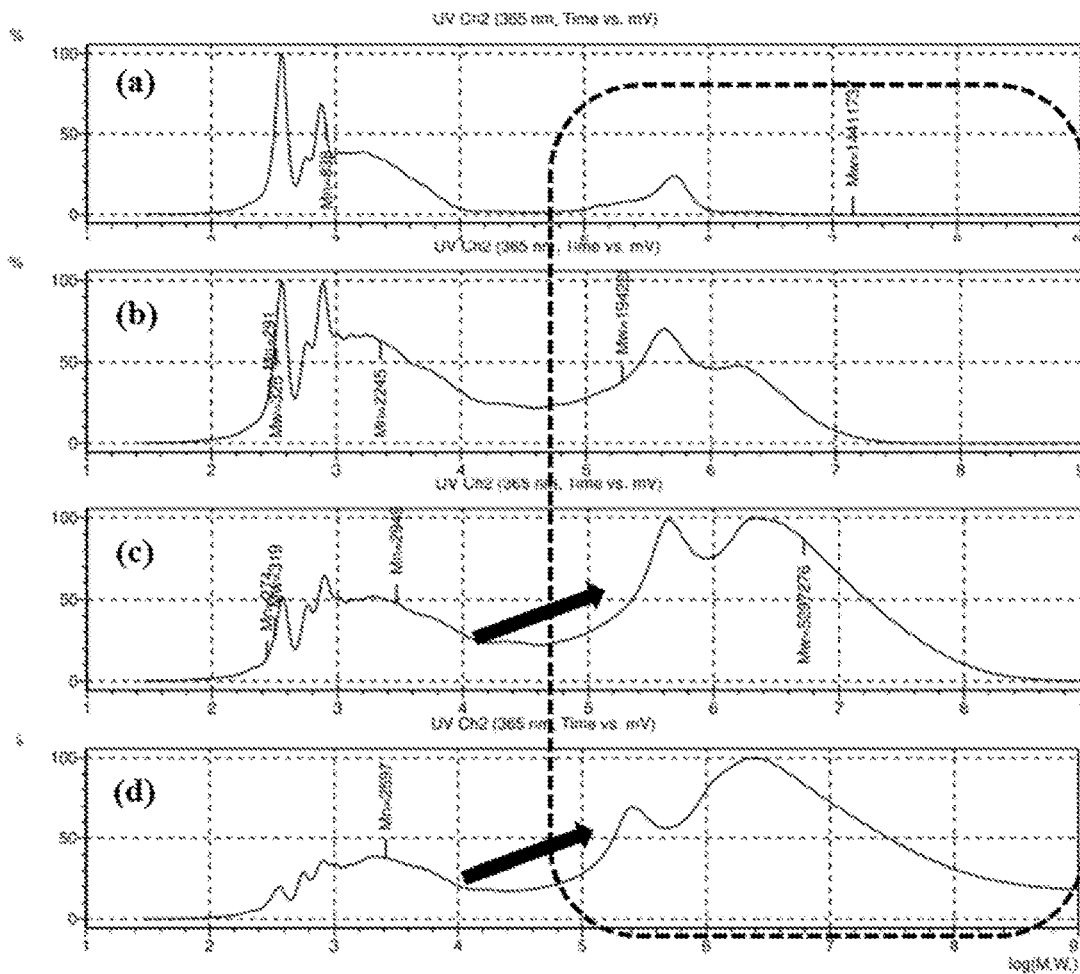
FIG. 23 is a graphical representation of the GPC results of thermoplastics for exemplary thermoplastic resin compositions of one or more embodiments (a) PDA(120-2-30)A, (b) PDA(150-2-5)A, (c) PDA(150-2-10)A, and (d) PDA(150-2-25)A (powder partially dissolved in NMP).

It has been demonstrated for PBB that the molecular weight of thermoplastics can be tuned through changing the polymerization condition. For a PDA crosslinkable thermoplastic, different molecular weights were also obtained through changing the isothermal temperature and time. As shown in FIG. 23, only oligomers were generated under an isothermal condition of 120° C. for 30 min (PDA(120-2-30)A). When isothermal at 150° C. for 5 min, the polymer had a medium MW (PDA(150-2-5)A). The highest MW were achieved at an isothermal condition of 150° C. for 10 min (PDA(150-2-10)A). When further extending the isothermal time to 25 min (PDA(150-2-25)A), crosslinked structures were generated and the polymer only partially dissolved into NMP.

Figure 24:
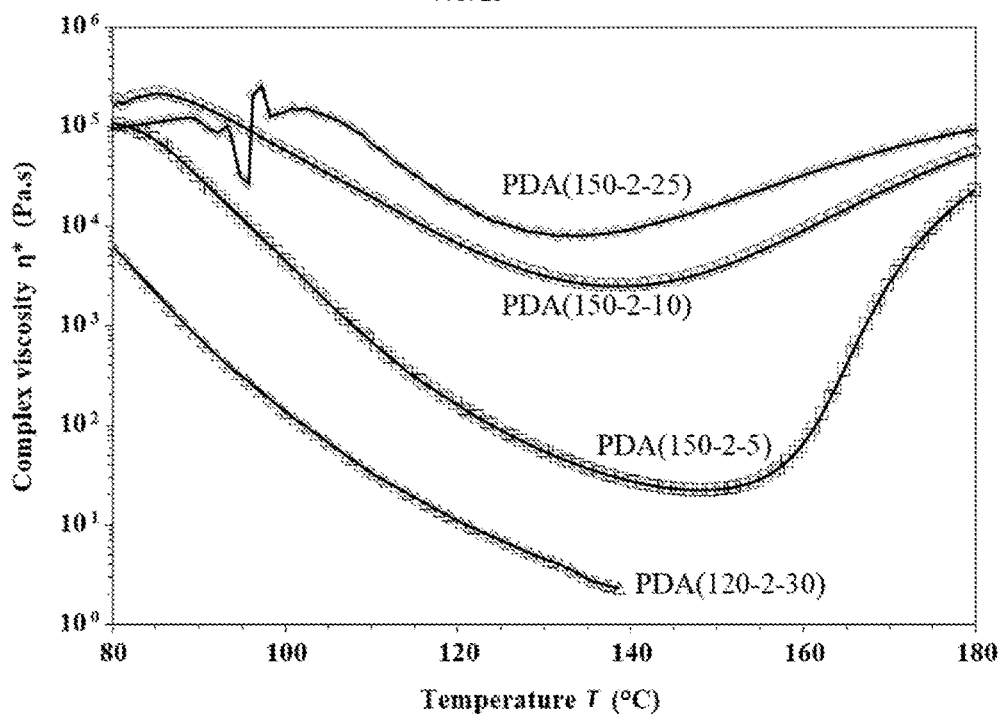
FIG. 24 depicts the rheological behavior of exemplary thermoplastic resin compositions of one or more embodiments.

The rheological behaviors of different MW PDA were characterized by a rheometer. As shown in FIG. 24, the viscosity of PDA increases with increasing the MW of PDA. PDA(120-2-30)A has the lowest viscosity of 2 Pa·s at 140° C. PDA(150-2-5)A has the lowest viscosity of 22 Pa·s at 150° C., while the viscosity of PDA(150-2-10)A increases to 2500 Pa·s at 150° C. PDA(150-2-25)A has the highest viscosity among all four samples due to the partially crosslinked structure. These rheology data indicate that all of the PDA resins except for PDA(150-2-25)A have low enough melt viscosities to be molded (remolded) into films using a hot press machine or an oven. A crosslinkable thermoplastic PDA(150-2-10)A film having a free standing property was also successfully made after coating its DMF solution on glass substrate, followed by the solvent drying at lower than 150° C. in an oven. DSC results showed that PDA(150-2-10) has a Tg of 91° C. and a exothermic peak derived from curing benzoxazine groups in the thermoplastic PDA(150-2-10) film at higher temperature than 180° C.

Figure 25A:
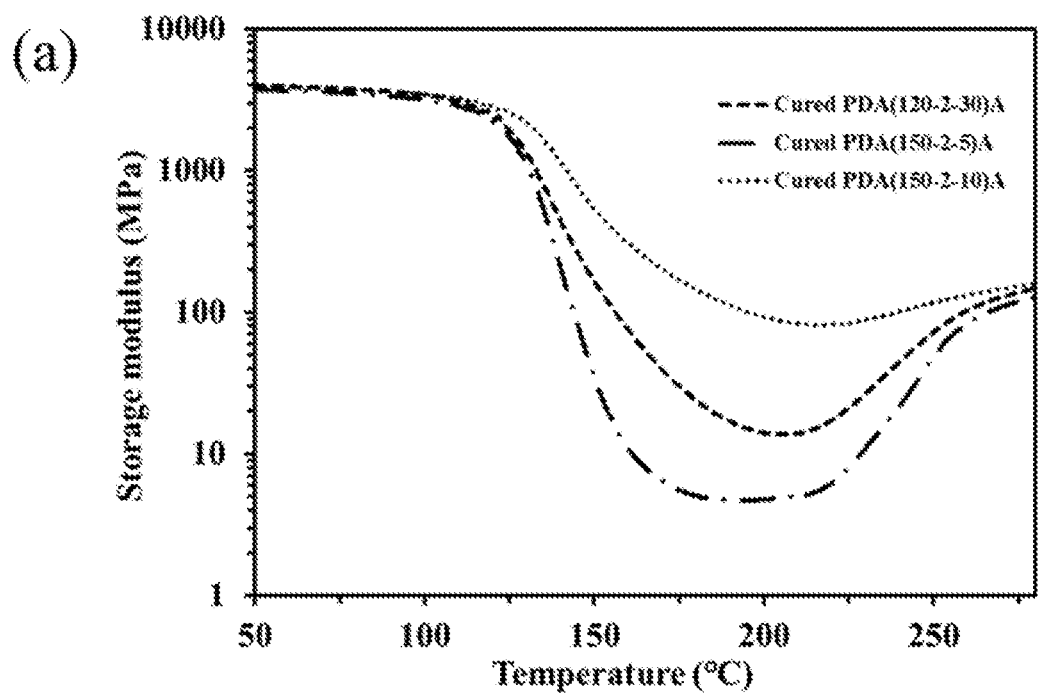
FIGS. 25A-B depict a dynamic mechanical analysis of the storage modulus (FIG. 25A) and the tan delta (FIG. 25B) of an exemplary cured thermoplastic resin composition of one or more embodiments.
Figure 25B:
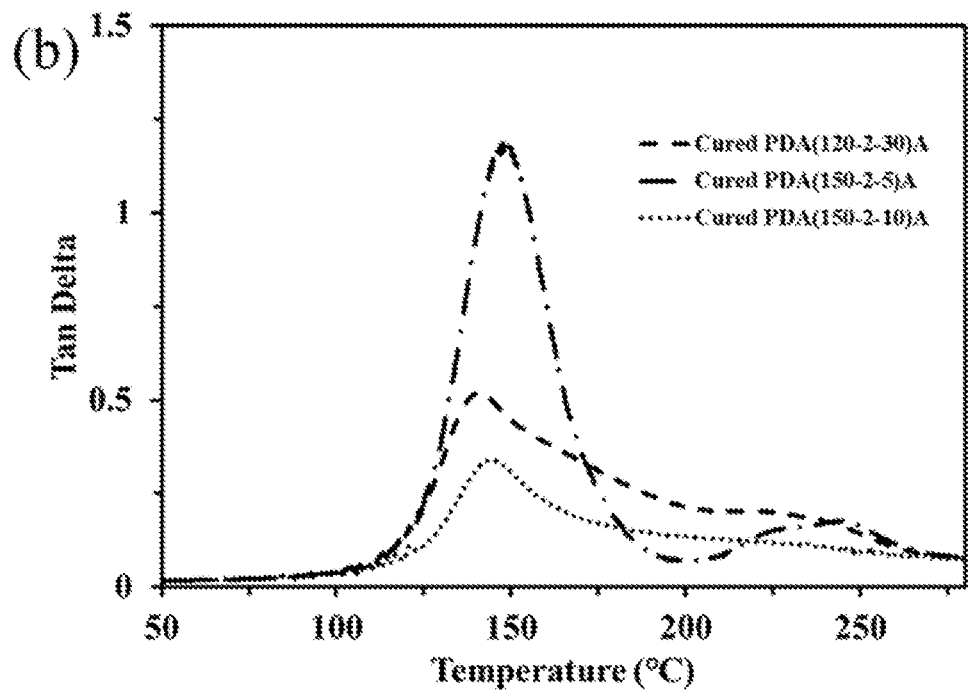

Three types of PDA resin powders were molded (remolded) into thin films by hot press, followed by being cured under a condition of 160° C. for 1 h, 185° C. for 3 h, and 218° C. for 1 h. DMA curves of these cured PDA films and the corresponding data are presented in FIGS. 25A-B and Table 3. These cured PDA resin films showed a similar storage modulus at 50° C. With increasing the testing temperature, these films showed a sharp decrease in the storage modulus around 120° C., indicating that a transformation of the morphology of the film occurred from a glassy state to a rubber state. The cured PDA(150-2-10)A film showed the highest Tg and the highest storage modulus at higher temperature than Tg. A high modulus in the rubbery plateau suggests a highly crosslinked network. All three cured PDA resins showed a tensile modulus of around 3.1-3.2 GPa, a tensile strength around 62-64 MPa, and an elongation-at-break of about 2.4%.

TABLE 3

Tensile Properties of PDAs (Example 8) and PPDA (Example 9)

| | Tg (DMA) (° C.) | Tensile modulus (GPa) | Tensile strength (MPa) | Elongation at break (%) |
|---|---|---|---|---|
| Cured PDA (120-2-30) | 120 | 3.28 ± 0.10 | 64.90 ± 7.96 | 2.42 ± 0.44 |
| Cured PDA (150-2-5) | 124 | 3.26 ± 0.06 | 63.13 ± 9.28 | 2.41 ± 0.38 |
| Cured PDA (150-2-10) | 127 | 3.13 ± 0.09 | 62.74 ± 4.78 | 2.45 ± 0.28 |
| Cured PPDA | 145 | 3.01 ± 0.13 | 51.75 ± 5.70 | 2.06 ± 0.28 |

A cured PPDA resin film was also made by the hot-press method using the same molding condition as PDA resins. The Tg and tensile properties of the cured PPDA are shown in Table 3. Compared with the cured PDA film, the cured PPDA film had a higher Tg of 145° C. However, the tensile properties were inferior by approximately 10-20% in comparison.

Synthesis of PDODA (Example 10)

PDODA was synthesized using the same method as described in Example 4. The PDODA synthetic scheme is shown in structure (XI).

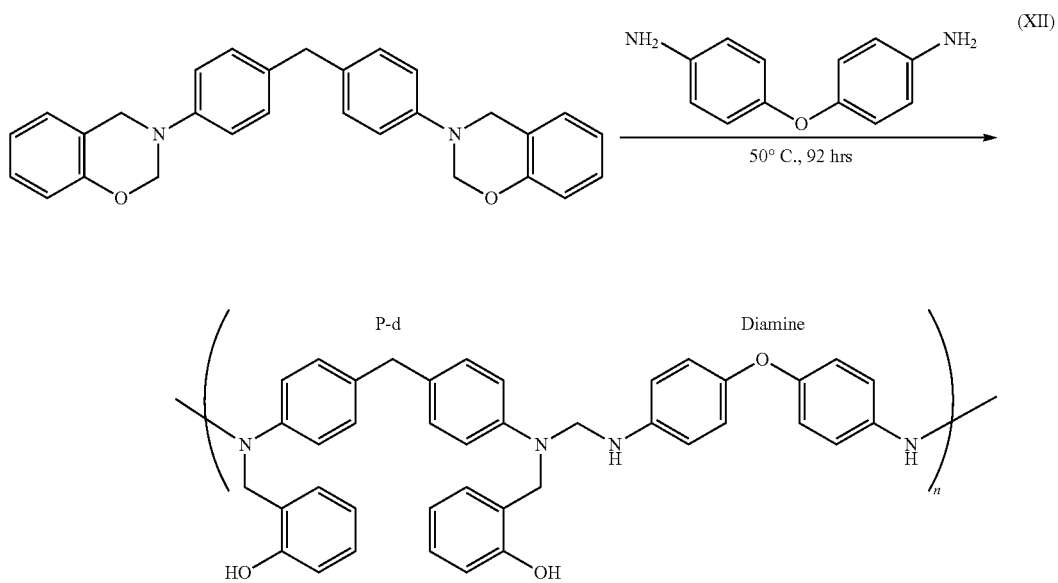

Synthesis of PDODA-MA (Example 11)

PDODA and methacrylic anhydride were added to a flask with molar ratio of reactive phenol to methacrylic anhydride equal to 1:5. The mixture was further added with 2 equivalent of sodium bicarbonate and an appropriate amount of THF. The reaction took place at room temperature for 24 hrs. The PDODA-MA synthetic scheme is shown in structure (XIII).

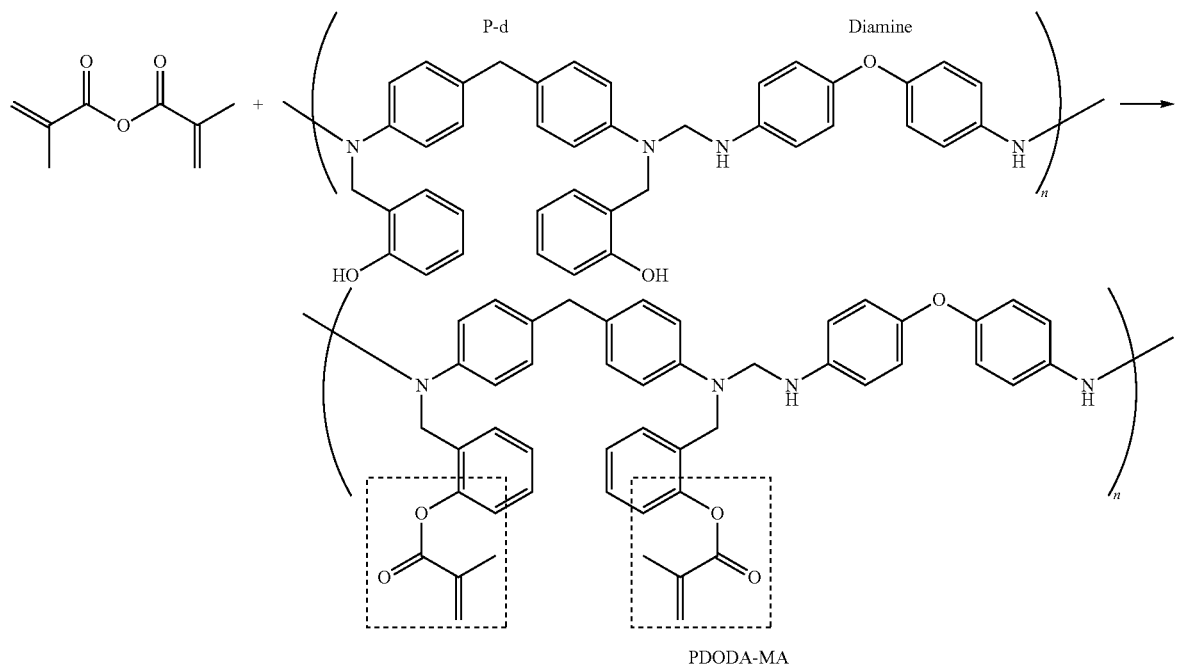

(XIII)

PDODA-MA

Example 12: UV Curing of PDODA-MA, VP and DMPA

Figure 26A:
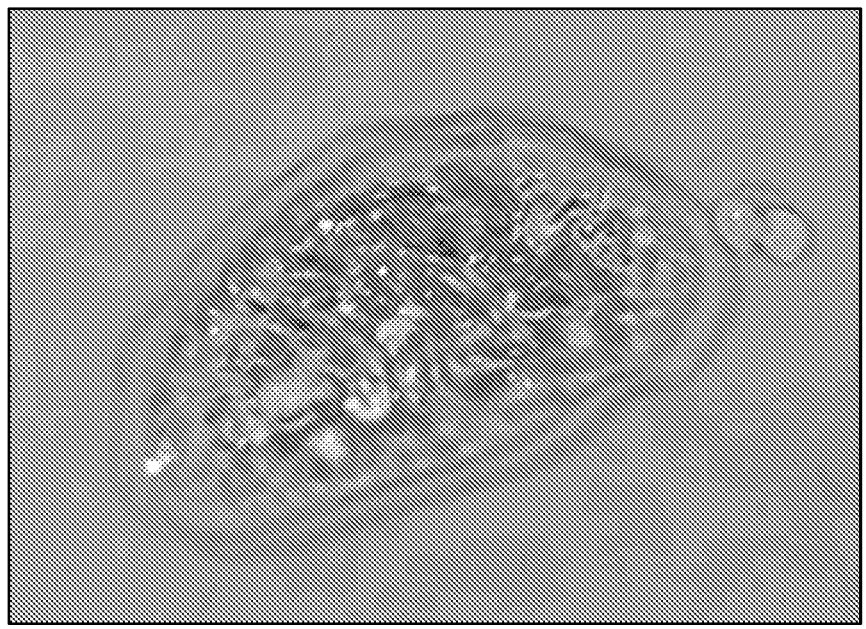
FIG. 26A is a photograph of a cured polymer composition in accordance with one or more embodiments of the present disclosure.

PDODA-MA was blended with VP and DMPA at a weight ratio of 20:65:15 and the mixture was sonicated for 5 minutes. The resultant mixture was a liquid at room temperature. UV radiation at 365 nm was applied to the liquid for 60 minutes via the hand-held UV lamp. The resultant product was a solid at room temperature and had a rough surface, as shown in FIG. 26A.

The solubility of the resin was tested to determine the extent of crosslinking that occurred from the UV treatment. The solid was not soluble in THF, indicating effective crosslinking due to UV exposure.

Comparative Example 12: UV Curing of VP and DMPA

Figure 26B:
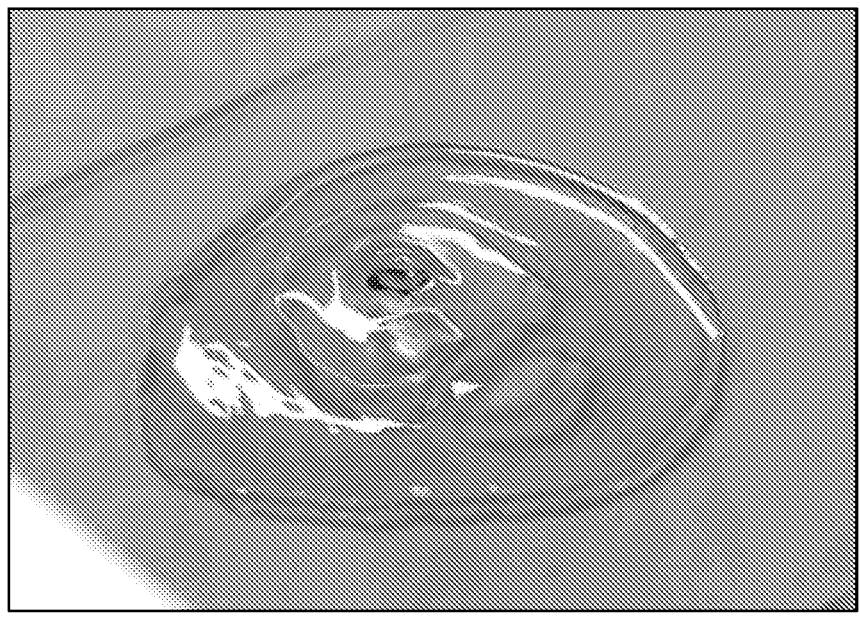
FIG. 26B is a photograph of a cured polymer composition in accordance with one or more embodiments of the present disclosure.

As a comparison, VP (2 g) and DMPA (350 mg) were blended in a ratio of 85:15 to form a liquid. The mixture was then cured according to the method of Example 12, resulting in a solid at room temperature with a relatively smooth surface, as shown in FIG. 26B. This resin dissolved readily in THF, indicating that significant crosslinking did not occur.

Example 13: UV Curing of PDODA-MA and DMPA

The UV curability of PDODA-MA without an additional monomer was tested by blending PDODA-MA with DMPA at a weight ratio of 95:5. THF was added to the mixture (roughly 0.5 mL of THF per gram of powder), and the THF was then evaporated in a rotary evaporator under vacuum at room temperature resulting in a paste. UV radiation was applied to the paste for 10 seconds using the UV curing machine. After UV curing, the sample was a solid powder. The solid powder was not soluble in THF, indicating effective crosslinking during the UV curing step.

DSC was performed on the PDODA-MA sample before and after UV curing, and the data is summarized in Table 4.

TABLE 4

| Sample | Property | Result |
| --- | --- | --- |
| PDODA-MA no UV | Appearance | Paste |
| PDODA-MA with UV | Appearance | Solid powder |
| PDODA-MA no UV | $1^{st}$ DSC cycle (curing peak) | 254° C. |
| PDODA-MA with UV | $1^{st}$ DSC cycle (curing peak) | 264° C. |
| PDODA-MA no UV | $2^{nd}$ DSC cycle (Tg) | 153° C. |
| PDODA-MA with UV | $2^{nd}$ DSC cycle (Tg) | 186° C. |

As shown in Table 4, the curing temperature of the resin that underwent UV treatment was higher than the resin with no UV treatment. Additionally, the glass transition temperature of the resin that underwent UV treatment was 33° C. higher than the resin with no UV treatment. These results indicate effective crosslinking of the resin via UV treatment.

Synthesis of PDODA-EP (Example 14)

2 g of PDODA, 25 ml of epichlorohydrin, 378 mg of NaOH, and 4.68 ml of water were added to a flask. The reaction took place at 50° C. for 24 hrs. The product was obtained by extraction using dichloromethane followed by solvent evaporation on a rotary evaporator. The structure of PDODA-EP is shown in structure (XIV), where "BZ" represents a benzoxazine moiety.

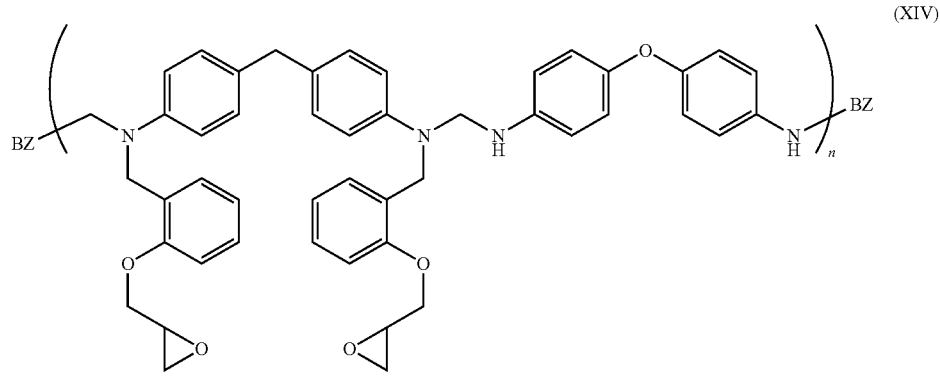

(XIV)

Example 15: Microwave Curing of PDODA-EP

The PDODA-EP resin was cured in a microwave at 900 W for 5, 10, and 15 minutes. A comparative sample experienced no microwave curing, meaning it was thermally cured during the heating via the DSC experiment. The samples were tested via DSC, and the results may be found in Table 5, below.

Comparative Example 15: Microwave Curing of PDODA

As comparative examples, PDODA without the microwave-curable epoxide functional group and PD (benzoxazine) were cured in a microwave at 900 W for 5, 10, and 15 minutes. A sample of each resin was thermally cured and experienced no microwave curing. The samples were tested via DSC, and the results may be found in Table 5, below.

TABLE 5

| Sample | Microwave curing time | Degree of curing (DSC 1st cycle) | Tg (° C.) (DSC 2nd cycle) |
| --- | --- | --- | --- |
| PDODA-EP | 0 | N/A | 207 |
| PDODA-EP | 5 | 0% | 212 |
| PDODA-EP | 10 | 100% | 216 |
| PDODA-EP | 15 | 100% | 217 |
| PDODA | 0 | N/A | <150 |
| PDODA | 5 | 0% | N/A |
| PDODA | 10 | 57% | N/A |
| PDODA | 15 | 100% | N/A |
| PD | 0 | N/A | N/A |
| PD | 5 | 3% | N/A |
| PD | 10 | 3% | N/A |
| PD | 15 | 31% | N/A |

As shown in Table 5, all three materials are microwave-curable to some extent. The PDODA and PD samples require 10-15 minutes or longer to be fully cured, while the PDODA-EP, which includes microwave-curable groups, takes 5-10 minutes to be fully cured. This is indicative of higher microwave curing efficiency in the sample that includes microwave-curable groups. In addition, in the sample that includes the microwave-curable groups in the polymer chain (PDODA-EP), the Tg has been dramatically improved from lower than 150° C. for PDODA to above 200° C. for PDODA-EP. It was also found that the microwave treatment had an improved effect as compared to the samples that only experienced thermal curing, as evidenced by the fact that the Tg of the microwave treated PDODA-EP is 10° C. higher than the PDODA-EP when cured only by thermal treatment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A crosslinkable thermoplastic resin composition, comprising:
   a polymer formed from the reaction between a bis-benzoxazine monomer and a bifunctional comonomer having phenol, amine, and/or thiol functional groups,
   wherein the polymer contains at least one crosslinkable group, and
   wherein the crosslinkable thermoplastic resin has a weight average molecular weight ranging from 1 to 1,000 kilodaltons and a polymer content of from 30 to 90 wt % based on a total weight of the composition.

2. The crosslinkable thermoplastic resin composition of claim 1, wherein the crosslinkable group is an endcap on the polymer.

3. The crosslinkable thermoplastic resin composition of claim 1, wherein the crosslinkable group is on a backbone of the polymer.

4. The crosslinkable thermoplastic resin composition of claim 1, wherein the resin composition has a melt viscosity of 10000 Pa·s or less at a temperature of 140° C.

5. The resin composition of claim 1, further comprising a UV- or microwave-curable functional group.

6. The resin composition of claim 5, wherein the UV- or microwave-curable functional group is the crosslinkable group.

7. The resin composition of claim 5, wherein the UV- or microwave-curable group reacts with the crosslinkable group.

8. The resin composition of claim 1 comprising an unreacted monomer content of 25 wt. % or less.

9. A method of forming a crosslinkable thermoplastic resin composition, comprising:
   reacting a bis-benzoxazine monomer and a bifunctional comonomer to form a polymer containing at least one crosslinkable group,
   wherein the crosslinkable thermoplastic resin has a weight average molecular weight ranging from 1 to 1,000 kilodaltons and a polymer content of from 30 to 90 wt % based on a total weight of the composition.

10. The method of claim 9, wherein the reacting step comprises solution polymerization in a solvent having a boiling point greater than 75° C. under 1 atm to form a benzoxazine resin in solution.

11. The method of claim 10, wherein the solvent is selected from the group consisting of ethyl acetate, 2-methoxyethanol, dimethylformamide (DMF), N-methylpyrrolidone (NMP), butyl acetate, a mixture of 2-methoxyethyanol/tetrahydrofuran (THF), and combinations thereof.

12. The method of claim 10, further comprising: purifying the benzoxazine resin out of the solution.

13. The method of claim 10, wherein a molar ratio between the bis-benzoxazine monomer and the bifunctional comonomer is from 1:1 to 2:1.

14. The method of claim 9, wherein the reacting step comprises melt polymerization of the bis-benzoxazine monomer and a bisphenol comonomer.

15. The method of claim 14, wherein a molar ratio between the bis-benzoxazine monomer and the bisphenol comonomer is from 1:10 to 10:1.

16. The method of claim 9, further comprising: modifying the thermoplastic resin composition to include a UV- or microwave-curable functional group.

17. A resin composition produced by the method of claim 9.

18. A method of forming a cured thermoplastic resin composition, comprising:
   providing crosslinkable thermoplastic resin composition according to claim 1; and
   curing the crosslinkable thermoplastic resin composition by applying an external stimulus to form the cured thermoplastic resin.

19. The method of claim 18, wherein the external stimulus is selected from the group consisting of: heat, ultraviolet irradiation, microwave irradiation, and moisture.

20. The method of claim 18, wherein the crosslinkable thermoplastic resin composition further comprises UV- or microwave-curable functional groups, and wherein the external stimulus comprises ultraviolet irradiation or microwave irradiation.

* * * * *